United States Patent [19]
Kato

[11] Patent Number: 5,692,767
[45] Date of Patent: Dec. 2, 1997

[54] VEHICLE SUSPENSION HAVING BUSHINGS WITH DIRECTION DEPENDENT ELASTIC PROPERTIES

[75] Inventor: Yoshihisa Kato, Aichi-Ken, Japan

[73] Assignee: Toyota Jidosha Kabushiki Kaisha, Aichi-Ken, Japan

[21] Appl. No.: 580,372

[22] Filed: Dec. 28, 1995

[30] Foreign Application Priority Data

Jan. 11, 1995 [JP] Japan ................. 7-002892

[51] Int. Cl.$^6$ ............... B60G 3/20; B60G 7/02
[52] U.S. Cl. ............ 280/690; 280/663; 280/673; 280/691; 267/293; 267/141.2
[58] Field of Search ........................ 280/673, 675, 280/661, 663, 666, 667, 690, 691, 692, 696, 697, 701, 726, 725, 716; 267/293, 292, 248, 141.2, 141.6, 141.3

[56] References Cited

U.S. PATENT DOCUMENTS

| | | | |
|---|---|---|---|
| 4,132,430 | 1/1979 | Bantle | 280/673 |
| 4,170,373 | 10/1979 | Beck et al. | 280/666 |
| 4,732,407 | 3/1988 | Oyama et al. | 280/673 |
| 4,740,012 | 4/1988 | Kondo et al. | 280/690 |
| 4,810,004 | 3/1989 | Kanai et al. | 280/690 |
| 5,190,269 | 3/1993 | Ikeda et al. | 267/293 |
| 5,362,093 | 11/1994 | Klosterhuber et al. | 280/716 |

FOREIGN PATENT DOCUMENTS

| | | | |
|---|---|---|---|
| 39 18 359 | 12/1990 | Germany | 280/673 |
| 63-246524 | 10/1988 | Japan | 267/293 |
| A-63-306908 | 12/1988 | Japan . | |
| 6-64435 | 3/1994 | Japan | 280/673 |

*Primary Examiner*—Brian L. Johnson
*Assistant Examiner*—Peter C. English
*Attorney, Agent, or Firm*—Oliff & Berridge

[57] ABSTRACT

A suspension for a vehicle includes a wheel support part, an upper arm and a lower arm. The wheel support part supports a wheel rotatably. The upper arm and the lower arm are swingably connected with the wheel support part and a body of a vehicle at respective ends thereof. The suspension also includes a load transmitting part and at least one bushing. The load transmitting part transmits the vertical load of the vehicle to the lower arm or the upper arm. A bushing arrangement connects the upper arm or the lower arm to the body and has different elastic properties in accordance with directions of force exerted on the bushing arrangement to control the camber of the wheel while maintaining a comfortable ride.

17 Claims, 18 Drawing Sheets

INNER WHEEL     OUTER WHEEL

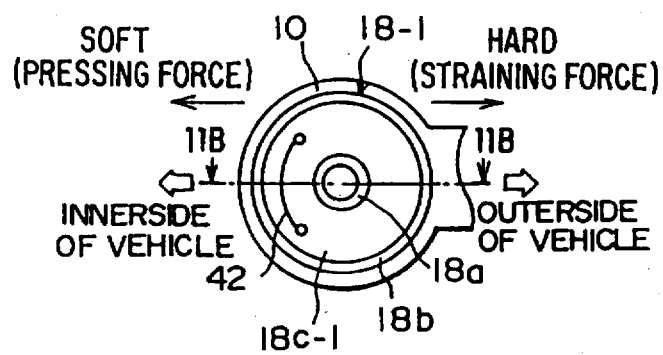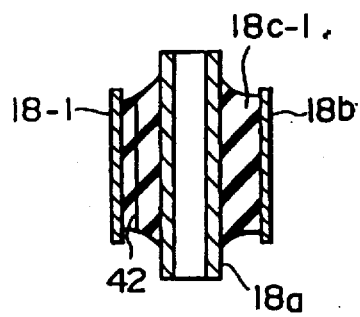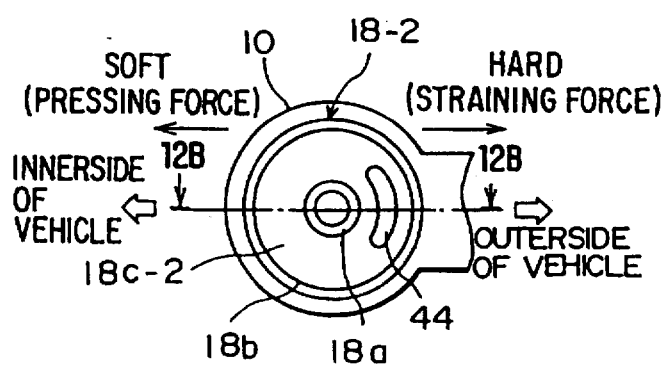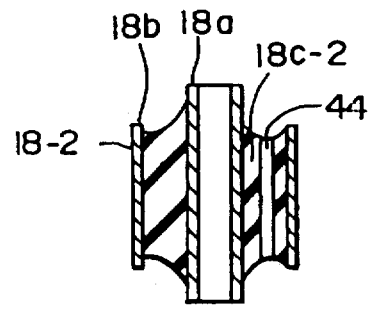

5,692,767

VEHICLE SUSPENSION HAVING BUSHINGS WITH DIRECTION DEPENDENT ELASTIC PROPERTIES

BACKGROUND OF THE INVENTION

1. Field of the Invention

The present invention generally relates to a suspension for a vehicle, more particularly, to a double wishbone type suspension for a vehicle which holds a wheel by an upper arm and a lower arm.

2. Description of the Related Art

A double wishbone type suspension which holds a wheel by an upper arm and a lower arm has been known as disclosed in Japanese Laid-open Patent application No. 63-306908. The suspension discussed therein holds a wheel in a negative camber state during turning of the vehicle. Hereinafter, a state in which an upper portion of a tire attached to a wheel leans to the inside of a vehicle will be called a negative camber state. On the other hand, a state in which an upper portion of a tire leans to the outside of a vehicle will be called a positive camber state.

As road contact area of a tire increases, cornering power of the tire increases. Thus, to generate enough cornering power during turning of the vehicle, it is preferable that the sum of road contact area of the tires doesn't decrease when lateral acceleration is exerted on the vehicle during turning. While the vehicle is turning, a force toward the inner side of the turn is exerted on the tires of the vehicle. Thus, to keep sufficient contact area, it is preferable that each of the tires lean to the center of the turn. That is, it is preferable that outer wheels of the turning vehicle have a negative camber angle and inner wheels of the turning vehicle have a positive camber angle. Hereinafter, the outer wheels of the turning vehicle are simply called the outer wheels and the inner wheels of the turning vehicle are simply called the inner wheels.

The moving direction of the vehicle is not always the same. Thus, it is necessary to make the camber angle of the right side wheels and the left side wheels of the vehicle change positively over a wide range to satisfy the requirement discussed above. Because of this, in practice, it is difficult to provide the camber angle discussed above to both of the outer wheels and the inner wheels.

While the vehicle is turning, the center of the vertical load of the vehicle moves toward the outside of the turn. Thus, road holding of the outer wheels has more influence on maneuverability of the vehicle than road holding of the inner wheels. Therefore, to obtain a high level of cornering ability by a simple structure, it is useful to keep the right wheels and the left wheels in the negative camber state as in the suspension discussed above.

The suspension discussed above has two A arms which are separately located so that a predetermined distance is obtained in the vertical direction. The A arms hold a wheel so that the wheel can move in a vertical direction while keeping the negative camber state. In the suspension, the outer wheels can be kept in the negative camber state in a condition in which the outer wheels are moving toward bound direction due to a rolling motion of the vehicle which occurs when the vehicle is turning. Therefore, according to the suspension, it is possible to always maintain good maneuverability of the vehicle.

In the suspension discussed above, the A arms are connected to a body portion of the vehicle via bushings. The bushings absorb vibration which is input to the A arms via the wheels and permit the A arms to move in a predetermined direction. The bushings are deformed when a large force is exerted between the wheel and the vehicle body. Thus, the wheels are able to move not only in the direction which is allowed by the structure of the suspension but also in various directions which are allowed by the elastic deformation of the bushings.

To give the suspension excellent ability for absorbing of vibrations of the vehicle, namely, to increase the riding comfort of the vehicle, it is preferable that the bushings have a low elasticity. However, the lower the elasticity of the bushings, the easier the outer wheels move toward the positive camber state during the turning of the vehicle. Therefore, according to the suspension discussed above, it is not necessarily easy to provide both of maintaining the outer wheels always in a predetermined negative camber state and giving the vehicle superior riding comfort.

SUMMARY OF THE INVENTION

It is a general object of the present invention to provide a novel and useful suspension for a vehicle in which the problems discussed above are eliminated.

A more specific object of the present invention is to provide a suspension for a vehicle which provides both high cornering ability and good riding comfort by using bushings which have different elastic properties in accordance with directions of force exerted thereon.

The above-mentioned objects of the present invention are achieved by a suspension for a vehicle including a wheel support portion which rotatably supports a wheel, and an upper arm and a lower arm swingably connected with the wheel support part and a body portion of a vehicle at respective ends of the arms. The suspension also includes a load transmitting part which transmits vertical load of the vehicle to one of the lower arm and the upper arm, and at least one bushing which connects one of the upper arm and the lower arm with the body. The bushing has different elastic properties in accordance with directions of force exerted on the bushing.

According to the present invention, the rigidity of the suspension depends on the elastic property of the bushing. Therefore, the suspension shows different rigidity in accordance with the direction of force which is exerted on the bushing. It is preferable that the suspension has low rigidity for increased riding comfort of the vehicle. On the other hand, it is preferable that the suspension has high rigidity to permit improved cornering ability of the vehicle. Thus, it is necessary to change the rigidity of the suspension to obtain both increased comfort and improved cornering ability. The direction of the force exerted on the bushing when the vehicle moves substantially straight is different from the direction of the force which is exerted on the bushing when the vehicle turns. In the present invention, the elastic property of the bushing becomes harder as the direction of the force changes to the force obtained when the vehicle turns hard. Therefore, the suspension of the present invention shows low rigidity when the vehicle moves substantially straight and high rigidity when the vehicle turns hard. As a result, both increased riding comfort and greatly improved cornering ability are provided by the suspension of the present invention.

Other objects, features and advantages of the present invention will become more apparent from the following detailed description when read in conjunction with the accompanying drawings.

BRIEF DESCRIPTION OF THE DRAWINGS

FIG. 11A is a plan view of a first embodiment of a bushing which is used for connecting an upper arm of the suspension shown in FIG. 1;

FIG. 11B is a cross-sectional view taken along a line 11B—11B shown in FIG. 11A;

FIG. 12A is a plan view of a second embodiment of a bushing which is used for connecting the upper arm of the suspension shown in FIG. 1;

FIG. 12B is a cross-sectional view taken along a line 12B—12B shown in FIG. 12A;

DESCRIPTION OF THE PREFERRED EMBODIMENTS

Figure 1:
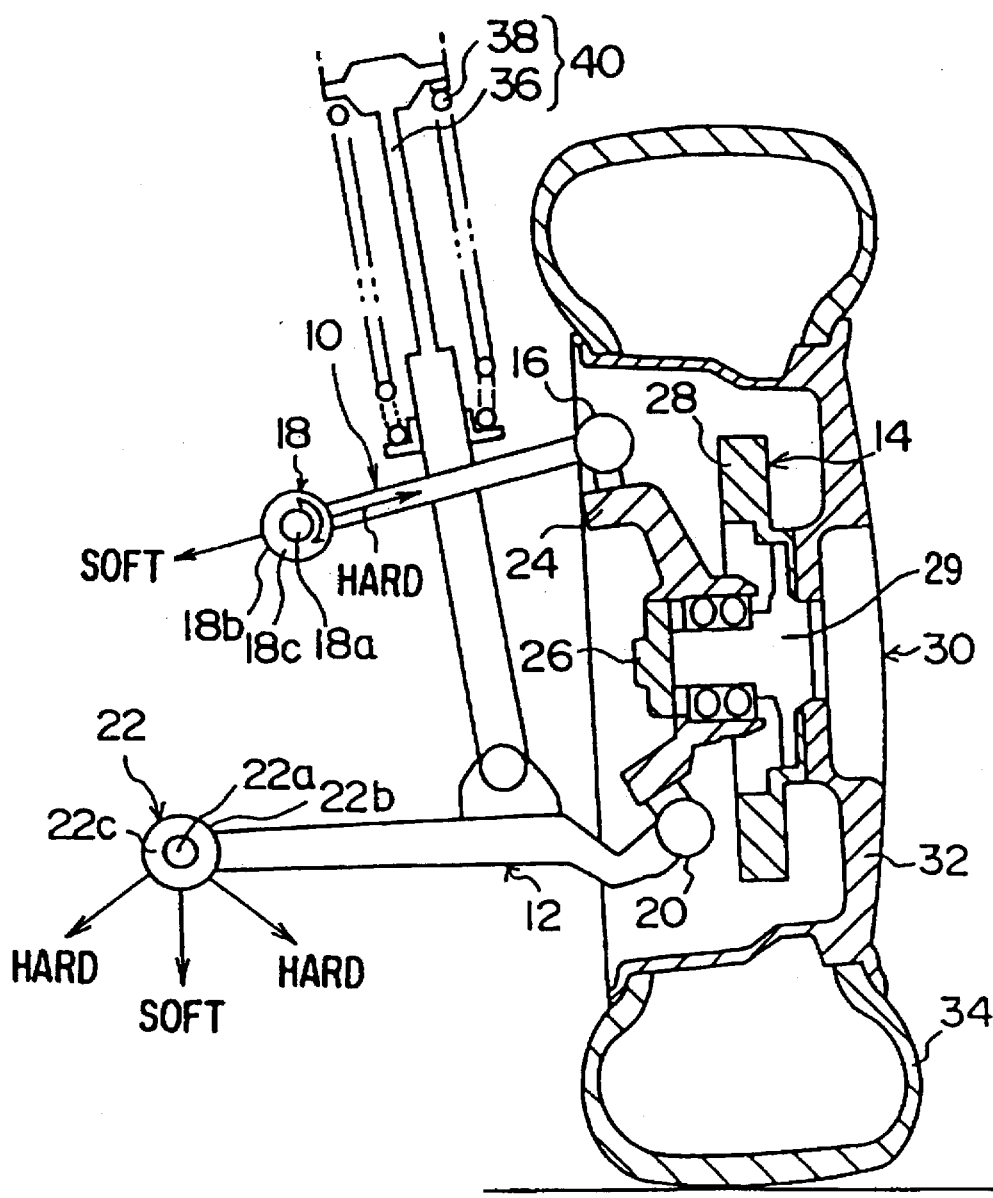
FIG. 1 is a front sectional view of suspension of a first embodiment of the present invention.
Figure 2:
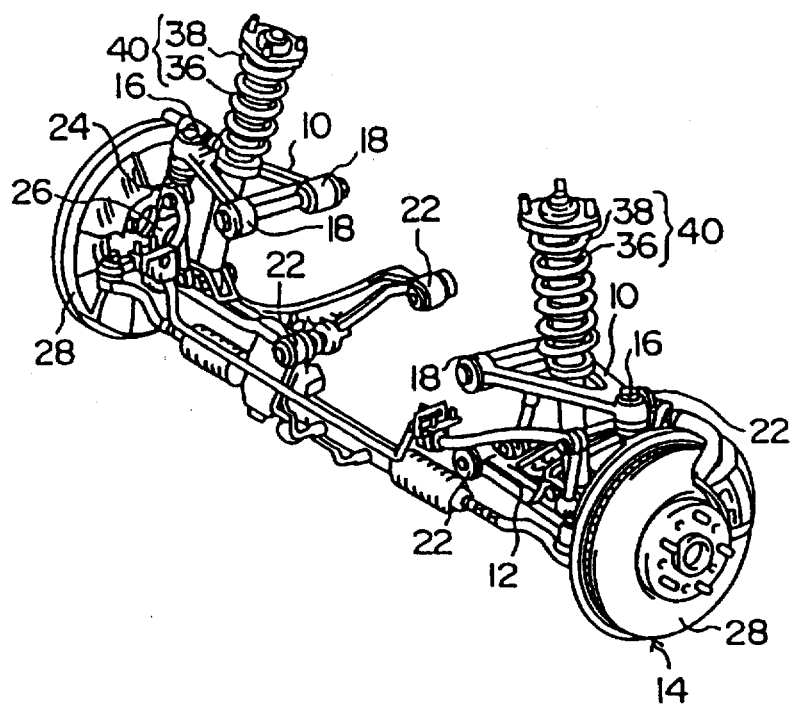
FIG. 2 is a perspective view of the suspension of the first embodiment.

A description will now be given, with reference to FIG. 1 through FIG. 9, of a suspension of a first embodiment of the present invention. FIG. 1 is a front sectional view of the suspension. FIG. 2 is a perspective view of the suspension showing the suspension for a right wheel and a left wheel.

As shown in FIG. 1 and FIG. 2, the suspension of the present embodiment is a double wishbone type suspension which has an upper arm 10 and a lower arm 12. The upper arm 10 and the lower arm 12 hold a wheel support part 14. The upper arm 10 has an upper ball joint 16 at an end which is connected with the wheel support part 14 and has two bushings 18 at another end which are connected with the body portion of a vehicle. The upper ball joint 16 is a connecting part which has a ball part attached to the end of the upper arm 10 and a holding part which holds the ball part and is attached to the wheel support part 14. The upper ball joint 16 connects the upper arm 10 and the wheel support part 14 so that the upper arm 10 and the wheel support part 14 can move in a substantially arcuate, vertical motion within a predetermined angle.

The bushing 18 has, as shown in FIG. 1, an inner cylinder 18a, an outer cylinder 18b, and an elastic portion 18c. The inner cylinder 18a and the outer cylinder 18b are formed so that the axial direction thereof corresponds with the longitudinal direction of the vehicle. The elastic portion 18c is formed between the inner cylinder 18a and the outer cylinder 18b and allows rotational movement between the inner cylinder 18a and the outer cylinder 18b within a predetermined angle. The upper arm 10 is connected with the vehicle body by attaching the outer cylinder 18b to the upper arm 10 and attaching the inner cylinder 18a to the body.

The lower arm 12 is assembled under the upper arm 10 so that a predetermined distance is obtained between the lower arm 12 and the upper arm 10. The lower arm 12 has, the same as the upper arm 10, a lower ball joint 20 at one end which is connected with the wheel support part 14 and has two bushings 22 at the other end which are connected with the body of the vehicle. Just as the upper ball joint 16, the lower ball joint 20 has a ball part and a holding part, and connects the lower arm 12 and the wheel support part 14 so that the lower arm 12 and the wheel support part 14 can move in a substantially arcuate, vertical motion within a predetermined angle. Moreover, the bushing 22, the same as the bushing 18, has an inner cylinder 22a, an outer cylinder 22b and an elastic portion 22c. The lower arm 12 is connected with the vehicle body by attaching the outer cylinder 22b to the lower arm 12 and attaching the inner cylinder 22a to the body.

The wheel support part 14 has a carrier 24, a bearing 26, a brake disc 28 and an axle hub 29. The carrier 24 is attached to the holding part of the upper and the lower ball joints 16 and 20. The bearing is put in the carrier 24 and holds the axle hub 29 so that the axle hub 29 can rotate. The brake disc 28 and a wheel 30 comprising a disc wheel 32 and a tire 34, are attached to the axle hub 29.

Generally, the suspension for a vehicle has load transmitting parts which transmit the vertical load of the vehicle to the suspension and absorb vibration from wheels. In the present embodiment, as shown in FIG. 1 and FIG. 2, the suspension has load transmitting parts 40 each of which consists of a shock absorber 36 and a coil spring 38 located around the shock absorber 36. The load transmitting parts 40 are assembled so that the upper ends thereof are attached to the body of the vehicle and the lower ends thereof are attached to the lower arms 12. Thus, in the present embodiment, the load of the vehicle is exerted on the lower arms 12. Hereinafter, the load exerted on each of the lower arms 12 will be called a spring load. According to the structure discussed above, only, a lateral force directed in an axial direction of the upper arms 10 is exerted. Therefore, in the present embodiment, all of the force exerted between the body of the vehicle and the wheel, except for the foregoing lateral force is accepted by the lower arms 12.

As discussed above, according to the suspension system which uses bushings to connect suspension arms with a body of a vehicle, such as the suspension of the present embodiment, it is difficult to maintain the outer wheels in an ideal negative camber state when high lateral acceleration is exerted on the vehicle. The suspension of the present embodiment has a feature wherein the outer wheels are maintained in a predetermined negative camber state during turning of the vehicle without decreasing the riding comfort of the vehicle by giving the upper and the lower arms 10 and 12 an appropriate length and giving the elastic portions 18c and 22c of the bushings 18 and 22 predetermined elastic properties.

As shown in FIG. 1, the bushing 18 has a hard elastic property against a tensile force on the outer cylinder 18b of the bushing 18, namely, the upper arm 10, in a direction toward the outside of the vehicle and has a soft elastic property against a compressive force which presses the outer cylinder 18b of the bushing 18 toward the inside of the vehicle, i.e., toward the longitudinal centerline of the vehicle. Moreover, the bushing 22 has a hard elastic property against a compressive force which presses the outer cylinder 22b of the bushing 22, namely, the lower arm 12, toward a lower-inner side of the vehicle or toward a lower-outer side of the vehicle and has a soft elastic property against a force which presses the outer cylinder 22b of the bushing 22 toward a lower side of the vehicle.

In a case where the bushings 18 and 22 have the elastic property discussed above, the suspension shown in FIG. 1 has high rigidity when high lateral acceleration is exerted on the vehicle due to turning of the vehicle and has low rigidity when high lateral acceleration is not exerted on the vehicle, namely, when the vehicle moves substantially straight. Accordingly, both improved cornering ability and good riding comfort are obtained by the suspension of the present embodiment.

Figure 3:
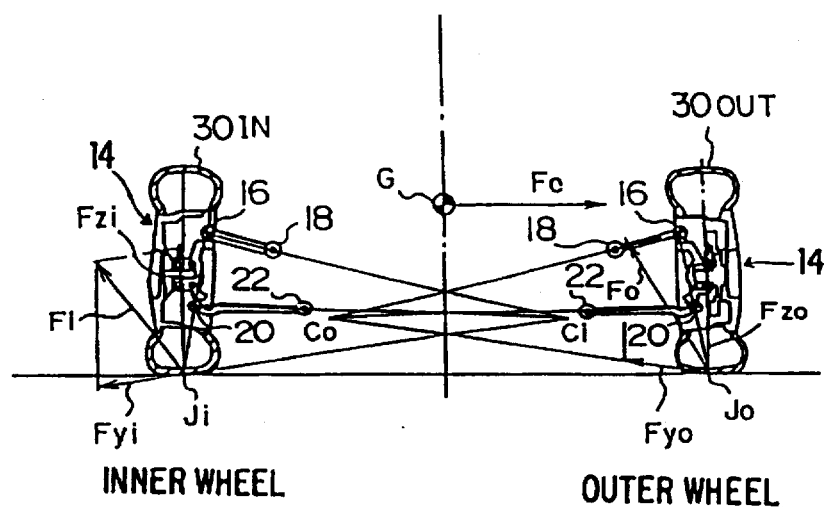
FIG. 3 shows vectors of force exerted on the suspension of the first embodiment during turning of a vehicle.

Hereinafter, the reason that the suspension of the present embodiment provides the function discussed above will be given with reference to FIG. 3 through FIG. 9. FIG. 3 shows force vectors exerted on the suspension holding a wheel 30 located on the outer side of a turning vehicle and a wheel 30 located on the inner side of the turning vehicle. Afterward, the wheel 30 located on the outer side of the turning vehicle will be called an outer wheel 30-out and the wheel 30 located on the inner side of the turning vehicle will be called an inner wheel 30-in.

In FIG. 3, a point G indicates a center of gravity of the vehicle and force Fc indicates lateral acceleration exerted on the center of gravity G. When the lateral acceleration Fc is exerted on the center of gravity G, the vehicle rolls toward the outer side of a turn. In a case where the rolling of the vehicle is set at an angle, at a road contact portion Jo of the outer wheel 30-out, force Fyo is exerted which is directed toward an instantaneous center Co of the outer wheel 30-out, and at a road contact portion Ji of the inner wheel 30-in force Fyi is exerted which has the same direction as a vector extending from an instantaneous center Ci of the inner wheel 30-in to the road contact portion Ji.

Incidentally, in a case where directions of the force Fyo and the force Fyi are not the same as the directions discussed above, rolling torque which makes the outer wheel 30-out and the inner wheel 30-in stroke toward a bound direction or a rebound direction remains on the vehicle. Thus, when the rolling of the vehicle is set at an angle, it can be determined that the direction of the force Fyo and the force Fyi are the same as the directions discussed above.

Load of the vehicle is transmitted to the outer wheel 30-out and inner wheel 30-in via the load transmitting parts 40. Thus, vertical load Fzo and Fzi are exerted at the road contact portions Jo and Ji, respectively, whether the vehicle is turning or not. Therefore, as shown in FIG. 3, a vector of a resultant force exerted at the road contact portion Jo of the outer wheel 30-out is indicated as a vector Fo directed toward the upper-inner side of the vehicle, and a vector of a resultant force exerted at the road contact portion Ji of the inner wheel 30-in is indicated as a vector Fi directed toward the upper-inner side of the vehicle. The wheel support parts 14 of the outer wheel 30-out and the inner wheel 30-in are supported by an upper ball joint 16 and a lower ball joint 20, respectively. Thus, each of the resultant forces Fo and Fi is accepted by the upper ball joint 16 and the lower ball joint 20 connected with each of the wheel support parts 14.

Figure 4:
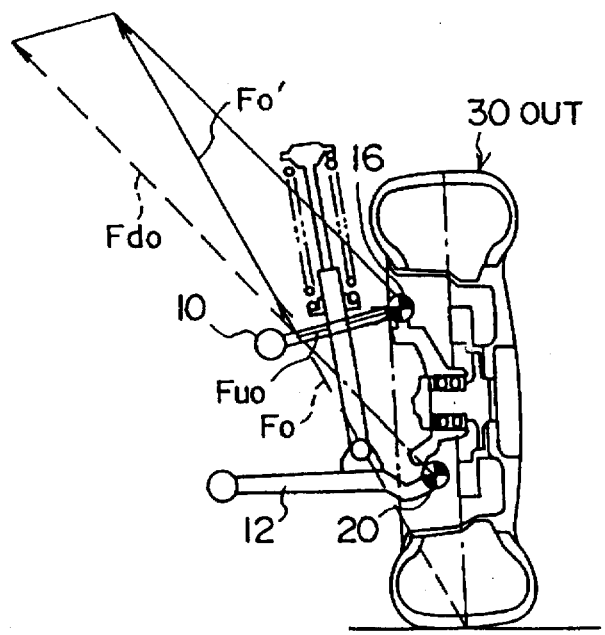
FIG. 4 shows a first group of vectors of force exerted on the suspension holding an outer wheel when a high lateral acceleration is exerted on the vehicle.

FIG. 4 shows force vectors exerted on the upper ball joint 16 and the lower ball joint 20 of the suspension which holds the outer wheel 30-out. The resultant force Fo shown in FIG. 3 can be considered as a vector Fo' which extends from a crossing point of the upper arm 10 and the vector Fo, as shown in FIG. 4. The vector Fo' can be separated into vectors Fuo which has the same direction as the axial direction of the upper arm 10 and a vector Fdo which has the same direction as a vector extending from the lower ball joint 20 toward a starting point of the vector Fo'. As discussed above, all of the forces exerted on the wheel 30, except for the force extending in the direction of the upper arm 10, is accepted by the lower arm 12. Thus, the vector Fuo shown in FIG. 4 can be considered as a vector of force exerted on the upper ball joint 16 and the vector Fdo shown in FIG. 4 can be considered as a vector of force exerted on the lower ball joint 20.

Figure 5:
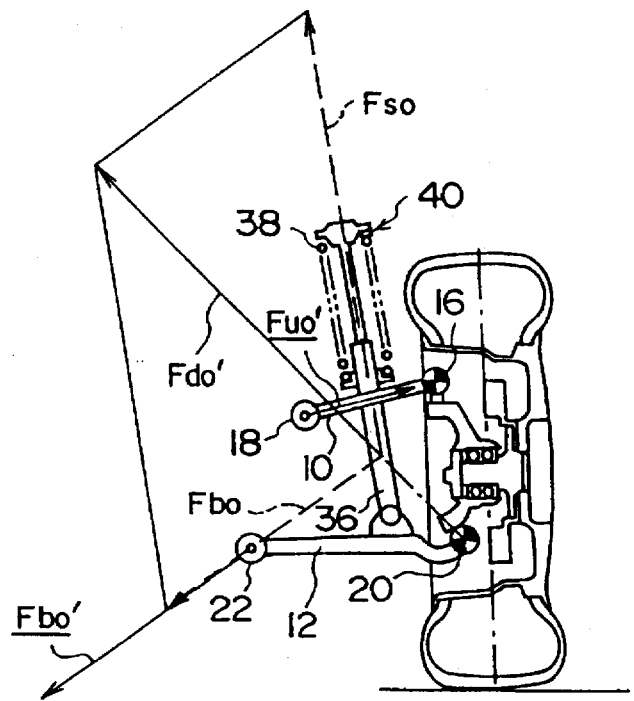
FIG. 5 shows a second group of vectors of force exerted on the suspension holding an outer wheel when a high lateral acceleration is exerted on the vehicle.

The vector Fuo and the vector Fdo can be rewritten as shown in FIG. 5. The force exerted on the upper ball joint 16 is the same as the force exerted on the bushing 18. Thus, as shown in FIG. 5, the force exerted on the bushing 18 of the suspension holding the outer wheel 30-out can be indicated as a vector Fuo' which has the same direction and the same strength force as the vector Fuo has. On the other hand, the force exerted on the lower ball joint 20, namely, the force indicated by the vector Fdo is transmitted to the bushing 22 and the shock absorber 36 via the lower arm 12. Thus, the bushing 22 of the lower arm 12 receives only the force which the load transmitting part 40 cannot accept.

The vector Fdo shown in FIG. 4 by a broken line can be considered as a vector Fdo' which extends from a crossing point of the axis of the shock absorber 36 and the vector Fdo. The vector Fdo' can be separated into a vector Fso which has the same direction as the axis of the shock absorber 36 and a vector Fbo which extends from the starting point of the vector Fdo' toward the bushing 22.

The shock absorber 36 is connected with the lower arm 12 so as to be able to move with the lower arm 12. Thus, the load transmitting part 40 can only accept a force which has the same direction as the axis of the shock absorber 36 has. Therefore, the vector Fso shown in FIG. 5 can be considered as a force vector accepted by the load transmitting part 40, and the vector Fbo, namely, the vector Fbo' shown in FIG. 5 can be considered as a force vector exerted on the bushing 22. The force Fbo' is directed to a lower-inner side of the turning vehicle. Accordingly, the bushing 22 of the suspension holding the outer wheel 30-out is pressed toward the lower-inner side of the vehicle.

Figure 6:
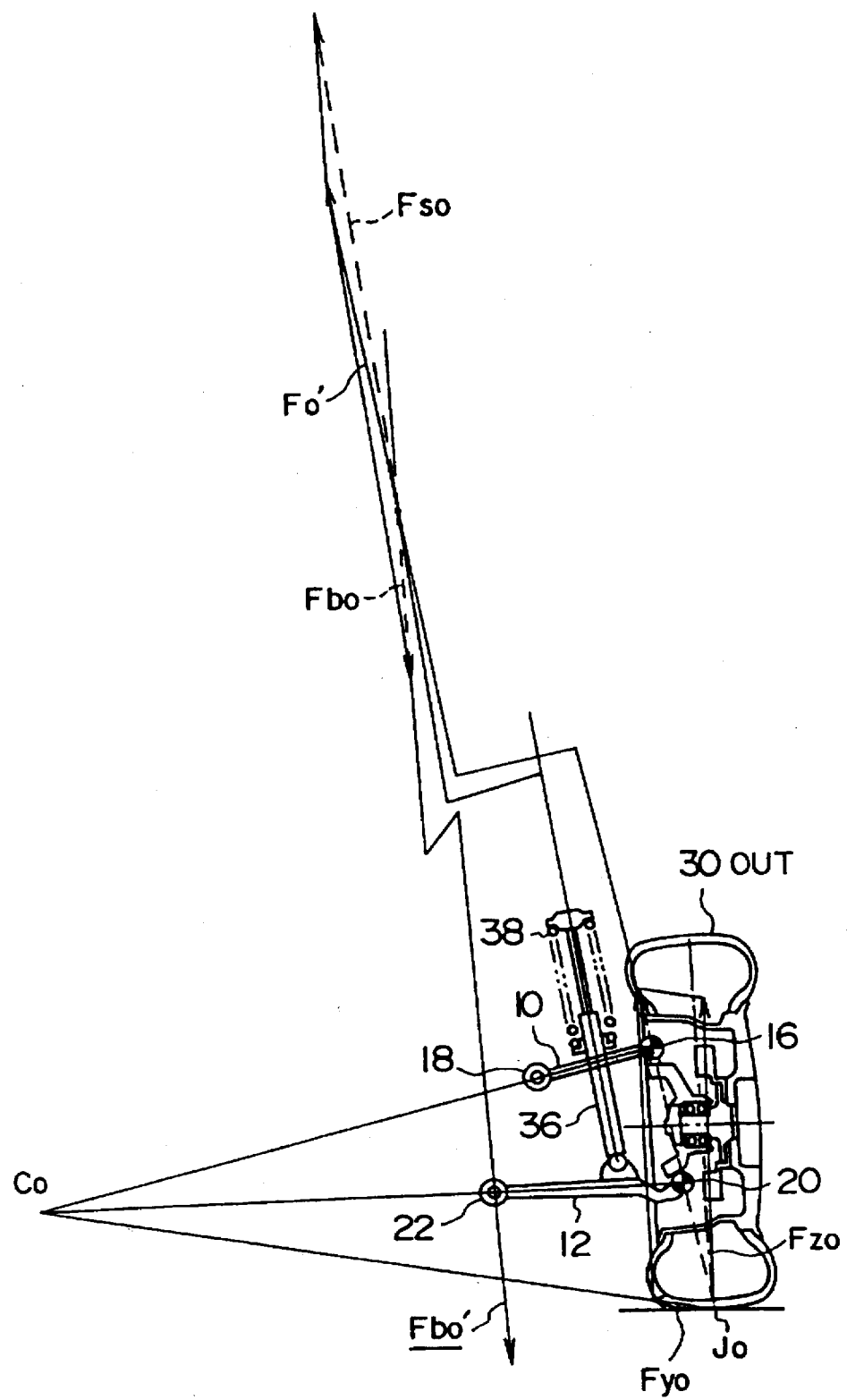
FIG. 6 shows vectors of force exerted on the suspension holding an outer wheel when a low lateral acceleration is exerted on the vehicle.

Hereinafter, a description of a movement of the suspension which occurs when the lateral acceleration Fc is less than that in the foregoing case will be given with reference to FIG. 6. FIG. 6 shows a situation in which the direction of the resultant force Fo and the axial direction of the upper arm 10 cross at a right angle. The force Fo is, as discussed above, a resultant force of the force Fyo generated as a reaction force of the lateral acceleration Fc and the vertical load Fzo. Thus, the smaller the lateral acceleration Fc is from the situation shown in FIG. 4, the more the direction of the resultant force moves closer to the vertical direction. Then, when an appropriate lateral acceleration is exerted on the center of gravity G while the vehicle is turning, the situation shown in FIG. 6 will occur.

In the situation shown in FIG. 6, the force Fo does not include a force having the same direction as the axial direction of the upper arm 10. Thus, in this situation, all force exerted on the outer wheel 30-out, namely, the resultant force Fo is only accepted by the lower ball joint 20. The force Fo which is exerted on the lower ball joint 20 can be indicated as a vector Fo' which extends from a crossing point of an extended line of the force Fo and an extended line of the axis of the shock absorber 36. The vector Fo' can be separated, as same as the case shown in FIG. 4 and FIG. 5, to a force Fso which has the same direction as the axis of shock absorber 36 and a force Fbo which extends from the starting point of the vector Fo' toward bushing 22.

The vector Fbo can be shown as a vector Fbo' which extends from the bushing 22. The vector Fbo' is directed, as shown in FIG. 6, toward a lower-outer side of the turning vehicle. Accordingly, in a situation where the lateral acceleration exerted on the center of gravity G is not very high, the bushing 22 of the suspension of the outer wheel 30-out is pressed toward the lower-outer side of the vehicle by the force Fbo' On the other hand, in this situation, the bushing 18 of the upper arm 10 is neither pressed nor strained by a large force.

Figure 7:
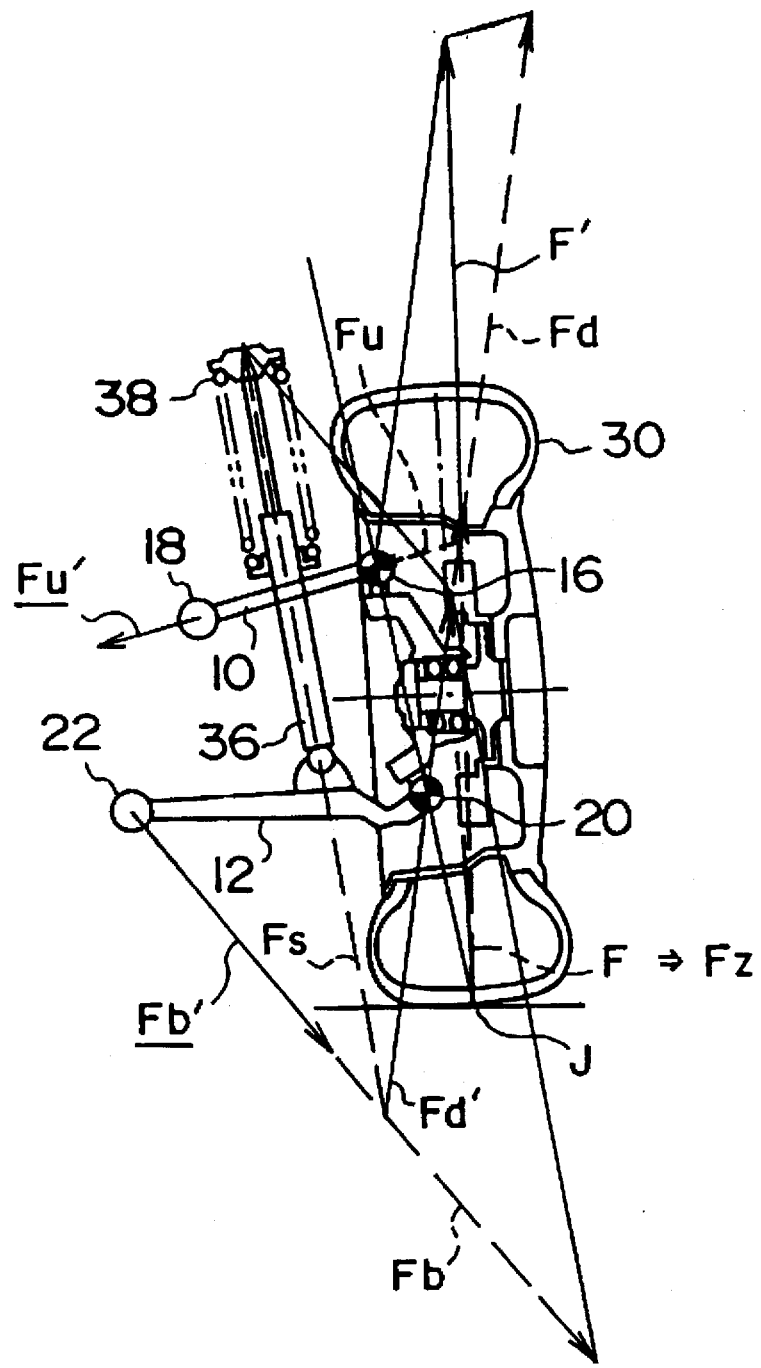
FIG. 7 shows vectors of force exerted on the suspension when the vehicle moves substantially straight.

Hereinafter, a description of a movement of the suspension in a case where almost no lateral acceleration Fc is exerted on the vehicle, namely, where the vehicle runs almost straight will be given with reference to FIG. 7. FIG. 7 shows force vectors exerted on the bushings 18 and 22 in the situation discussed above.

In the situation shown in FIG. 7, since almost no lateral acceleration is exerted on the vehicle, reaction force of the lateral acceleration is not exerted at a road contact portion J of the wheel 30. Thus, in this case, it is considered that the force F exerted on the wheel 30 is equal to the vertical load Fz. Accordingly, when the vehicle moves substantially straight, only the vertical load of the vehicle is exerted on the bushings 18 and 22.

The force F shown in FIG. 7 can be considered as a vector F' which extends from a crossing point of an axial line of the upper arm 10 and the vector F. The vector F' can be separated into a vector Fu which has the same direction as the axial direction of the upper arm 10 and a vector Fd which has the same direction as a vector extending from the lower ball joint 20 toward the starting point of the vector F'. Moreover, the force Fu can be considered as a vector Fu' which extends from the bushing 18 toward the lower-inner side of the vehicle. Thus, when the vehicle moves substantially straight, the bushing 18 is pressed toward the lower-inner side of the vehicle by the force Fu'.

The vector Fd discussed above can be indicated as shown as a vector Fd' which extends from a crossing point of an extended line of the force Fd and an extended line of the axial line of the shock absorber 36. The vector Fd' can be separated into a vector Fs which has the same direction as the axial direction of the shock absorber 36 and a vector Fb which has the same direction as a vector extending from the bushing 22 to the starting point of the vector Fd'. The vector Fb can be shown as a vector Fb' which extends from the bushing 22 toward the lower-outer side of the vehicle. Thus, when the vehicle moves substantially straight, the bushing 22 is pressed toward the lower-outer side of the vehicle by the force indicated by the vector Fb'.

Figure 8:
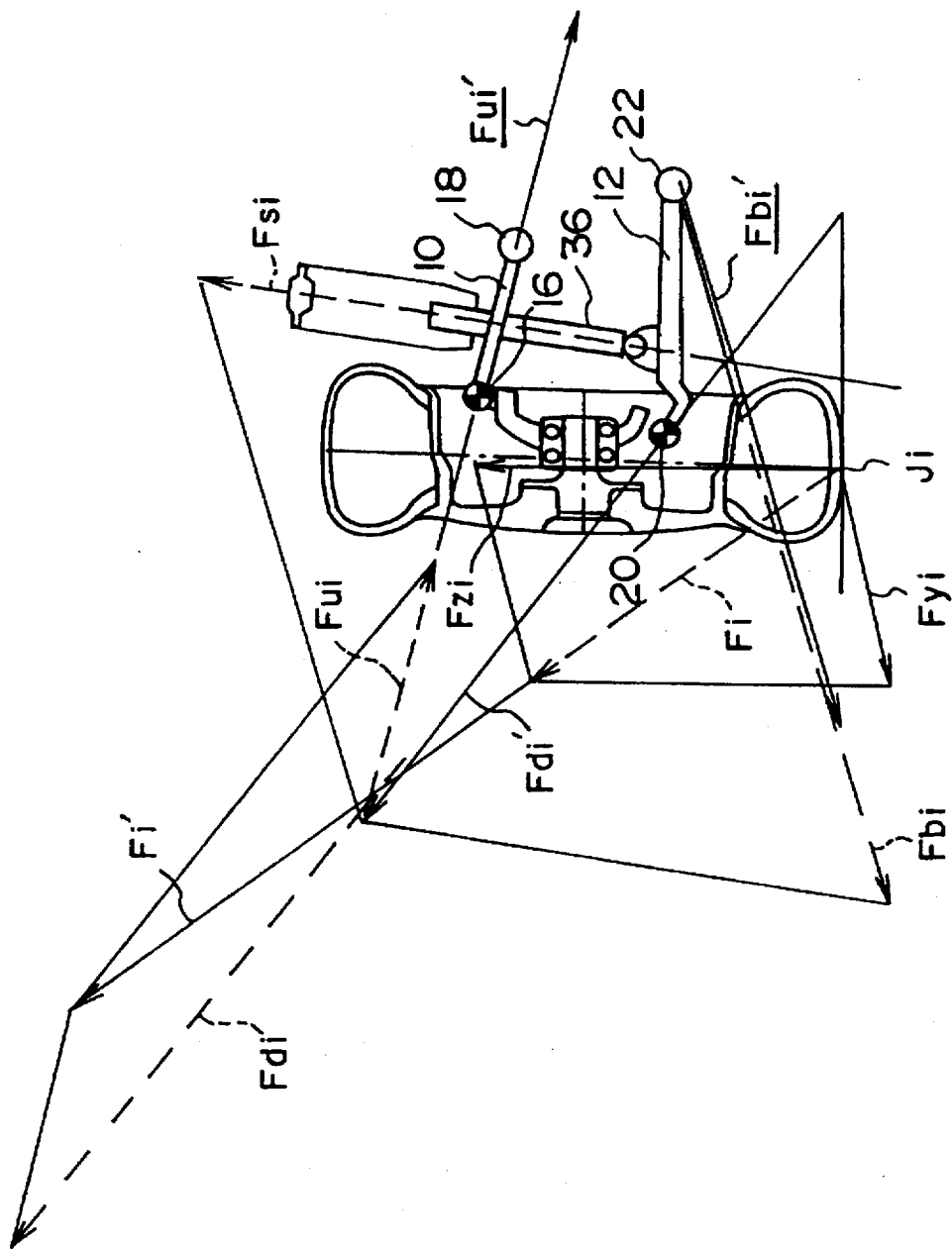
FIG. 8 shows vectors of force exerted on the suspension holding an inner wheel when a high lateral acceleration is exerted on the vehicle.
Figure 9:
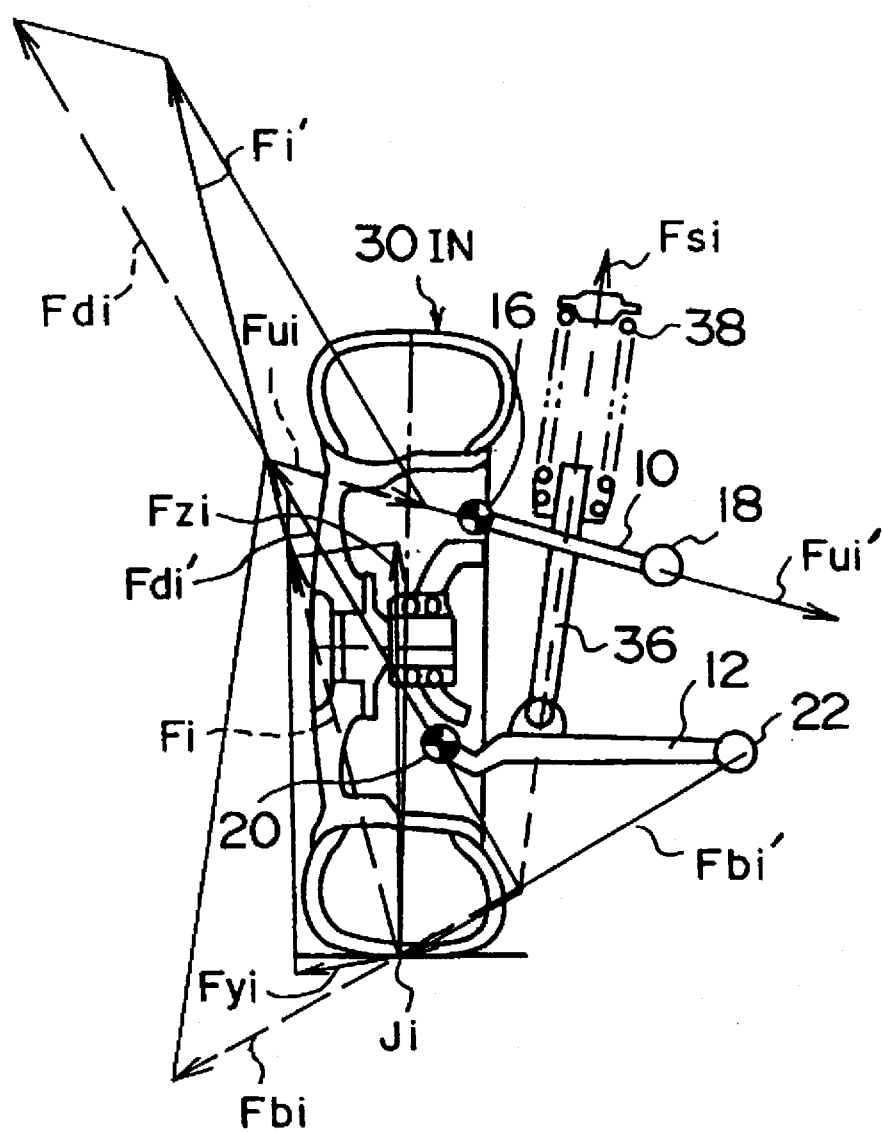
FIG. 9 shows vectors of force exerted on the suspension holding an inner wheel when a low lateral acceleration is exerted on the vehicle.

Hereinafter, a description of directions of force exerted on bushings 18 and 22 of the suspension of the inner wheel 30-in will be given with reference to FIG. 8 and FIG. 9. FIG. 8 shows force vectors exerted on the suspension of the inner wheel 30-in when comparative large lateral acceleration is exerted on the vehicle. On the other hand, FIG. 9 shows force vectors exerted on the suspension of the inner wheel 30-in when comparative small lateral acceleration is exerted on the vehicle.

As discussed above, at the road contact portion Ji of the inner wheel 30-in a force Fyi is exerted which has the same direction as a vector extending from an instantaneous center Ci of the inner wheel 30-in toward the road contact portion Ji. Thus, a resultant force Fi of the force Fyi and the vertical load Fzi is exerted at the road contact portion Ji. As shown in FIG. 8 and FIG. 9, the resultant force is shown as a vector Fi extending toward the upper-inner side of the turning vehicle. Moreover, the vector Fi can be indicated as a vector Fi' which extends from a crossing point of an extended line of the vector Fi and an extended line of the axial line of the upper arm 10.

The vector Fi' can be separated into a vector Fui which has the same direction as the axial direction of the upper arm 10 and a vector Fdi which extends from the starting point of the vector Fi'. The vector Fdi can be indicated as a vector Fdi' which extends from a crossing point of an extended line of the vector Fdi and an extended line of the axial line of the shock absorber 36. Moreover, the vector Fdi' can be separated into a vector Fsi which extends in the axial direction of the shock absorber 36 and a vector Fbi which extends from the starting point of the vector Fdi'.

The vector Fui directed toward the axial direction of the upper arm 10 is considered as a vector of force Fui' exerted on the bushing 18. On the other hand, the vector Fbi directed from the starting point of the vector Fdi' is considered as a vector of force Fbi' exerted on the bushing 22. As shown in FIG. 8 and FIG. 9, whether the lateral acceleration Fc is large or small, the force Fui' extends toward the lower-inner side of turning vehicle and the force Fbi' extends toward the lower-outer side of the turning vehicle. Incidentally, as the lateral acceleration increases, the direction of the force Fui' moves closer to the horizontal direction.

Figure 10:
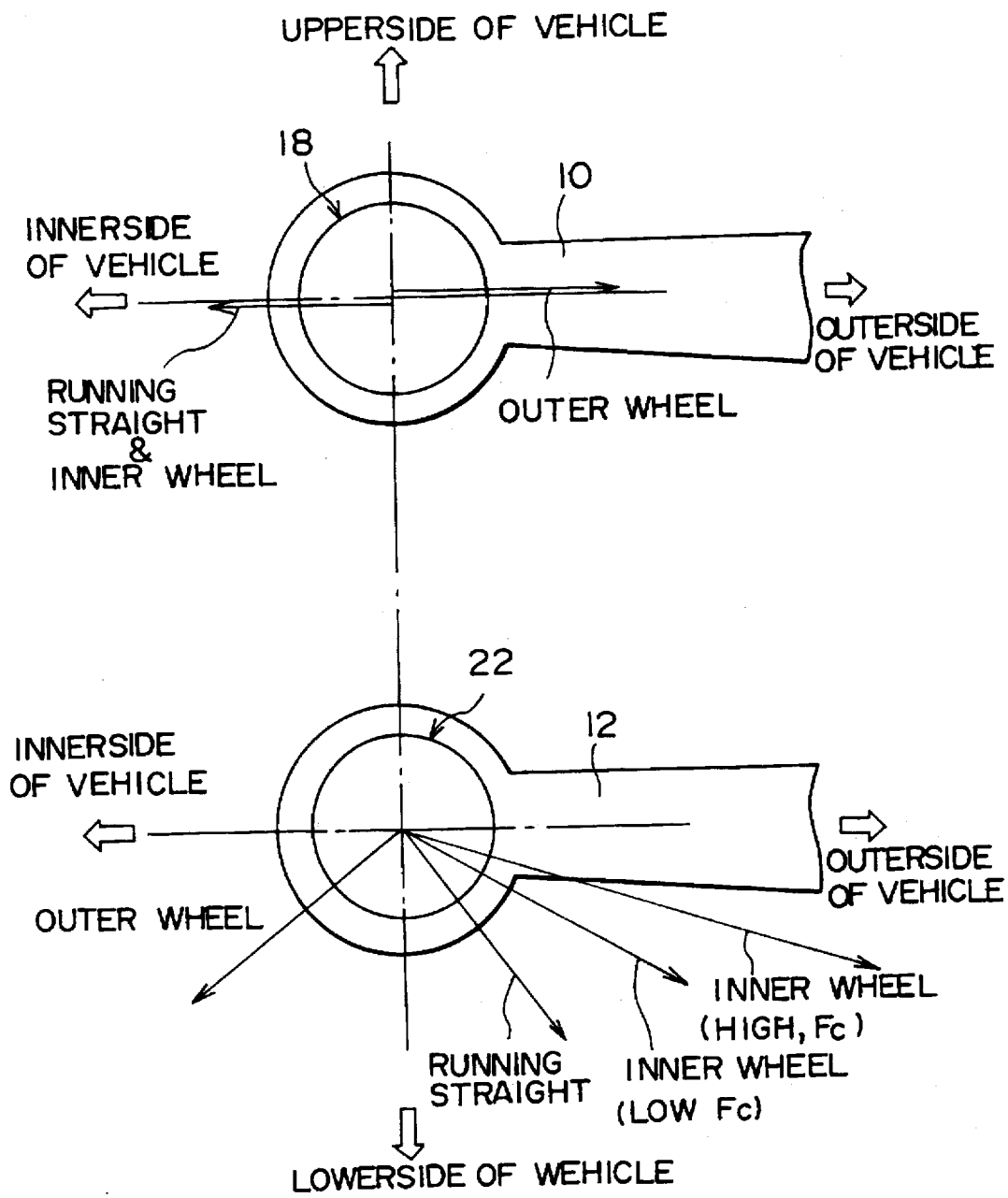
FIG. 10 shows a direction of force exerted on the suspension in several situations.

FIG. 10 shows details of the above description, namely, the directions of the force exerted on the bushings 18 and 22 in several situations discussed above. As shown in FIG. 10, the bushing 18 is strained toward the outer side of the vehicle when the wheel 30, connected with the bushing 18, is the outer wheel 30-out. On the other hand, the bushing 18 is pressed toward the inner side of the vehicle when the vehicle moves substantially straight or the wheel 30, connected with the bushing 18, is the inner wheel 30-in. Therefore, if the bushing 18 has a hard elastic property against a force directed toward an outer side of the vehicle and has a soft elastic property against a force directed toward an inner side of the vehicle, a movement toward the positive camber state of the outer wheel 30-out would be effectively prohibited and vibrations transmitted to the wheel 30 when the vehicle moves substantially straight would be effectively absorbed by the suspension.

On the other hand, as shown in FIG. 10, the bushing 22 is pressed toward the lower-inner side of the vehicle when the wheel 30, connected with the bushing 22, is the outer wheel 30-out. Moreover, the direction of the force exerted on the bushing 22 is sequentially changed toward the lower-outer side of the vehicle as the wheel 30 changes from the outer wheel 30-out to the inner wheel 30-in. Therefore, if the bushing 22 has a hard elastic property against a force directed toward a lower-inner side of the vehicle, and has a soft elastic property against a force directed toward a lower side of the vehicle movement toward the positive camber state of the outer wheel 30-out would be effectively prohibited, and the vibration transmitted to the wheel 30 when the vehicle moves substantially straight would be effectively absorbed. Moreover, movement toward an excessive negative camber state of the inner wheel 30-in would be effectively prohibited by the suspension.

In the present embodiment, as shown in FIG. 1, the preferable elastic properties discussed above are given to the bushings 18 and 22, respectively. Therefore, according to the suspension of the present embodiment, it is possible to effectively absorb the running vibration and to keep the outer and inner wheel 30-out and 30-in in an ideal negative camber state during a turning movement of the vehicle. Accordingly, both improved riding comfort and increased cornering ability are obtained by the suspension of the present embodiment.

FIG. 11 through FIG. 14 show bushings 18-1~18-4 which are embodiments of the bushing 18 used in the suspension shown in FIG. 1. FIG. 11A~FIG. 14A are plan views of the bushings 18-1~18-4 and FIG. 11B~FIG. 14B are cross-sectional views of the bushings 18-1~18-4 which are taken along a line 11B-11B~14B-14B, respectively, indicated in FIG. 11A~FIG. 14A. The bushings 18-1~18-4 have features at their elastic portions 18c-1~18c-4. Thus, a description of the inner cylinder 18a and the outer cylinder 18b will be omitted.

The bushing 18-1 shown in FIG. 11 includes an elastic portion 18c-1 which has a slit 42 located closer to the inner side of the vehicle than the inner cylinder 18a. According to the bushing 18-1, a hard elastic property, which is obtained in the absence of the slit 42, is obtained when a strain force directed toward the outer side of the vehicle is exerted on the upper arm 10. On the other hand, when a pressing force directed toward the inner side of the vehicle is exerted on the upper arm 10, a soft elastic property is obtained by separating the slit 42. As discussed above, the bushing 18-1 has the elastic properties which are required of the bushing 18.

The bushing 18-2 shown in FIG. 12 includes an elastic portion 18c-2 which has a through hole 44 located in the outer side of the inner cylinder 18a. When a strain force directed toward the outer side of the vehicle is exerted on the upper arm 10, the strain force is accepted by a portion of the elastic portion 18c-2 located at an inner side of the inner cylinder 18a. Thus, in this case, the bushing has a hard elastic property almost the same as without the through hole 44. On the other hand, when a pressing force directed toward the inner side of the vehicle is exerted on the upper arm 10, a soft elastic property is obtained by compression of the through hole 44. As discussed above, the bushing 18-2 has the elastic properties which are required of the bushing 18.

Figure 13A:
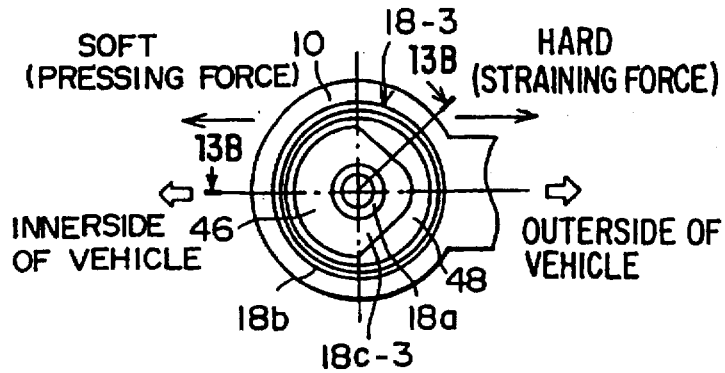
FIG. 13A is a plan view of a third embodiment of a bushing which is used for connecting the upper arm of the suspension shown in FIG. 1.
Figure 13B:
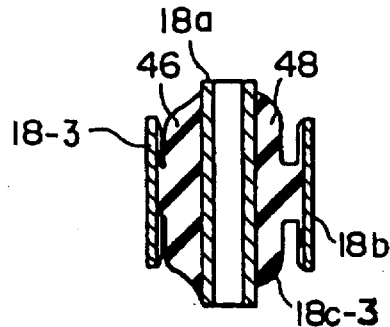
FIG. 13B is a cross-sectional view taken along a line 13B—13B shown in FIG. 13A.
Figure 14A:
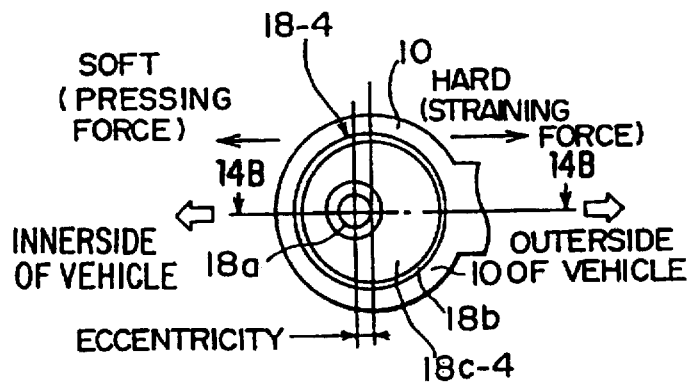
FIG. 14A is a plan view of a fourth embodiment of a bushing which is used for connecting the upper arm of the suspension shown in FIG. 1.
Figure 14B:
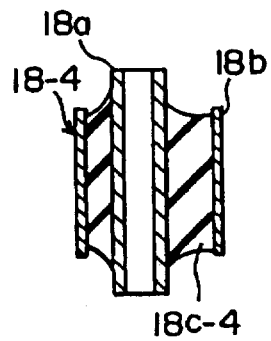
FIG. 14B is a cross-sectional view taken along a line 14B—14B shown in FIG. 14A.

The bushing 18-3 shown in FIG. 13 includes an elastic portion 18c-3 which has a thick portion 46 and a thin portion 48. The elastic portion 18c-3 is formed so that the thin portion 48 is bigger at an outer side of the vehicle than at an inner side of the vehicle. According to the structure, the inner side portion of the elastic portion 18c-3 is given a comparatively hard elasticity and the outer side portion of the elastic portion 18c-3 is given a comparatively soft elasticity. Therefore, the bushing 18-3 has a hard elastic property against the strain force on the upper arm 10 toward the outer side of the vehicle and has a soft elastic property against the force pressing the upper arm 10 toward the inner side of the vehicle.

The bushing 18-4 shown in FIG. 14 includes an elastic portion 18c-4 which holds the inner cylinder 18a closer to the inner side than the outer side of the outer cylinder 18b. In this case, only a small deformation will be permitted to the elastic portion 18c-4 when a strain force, directed toward the outer side of the vehicle, is exerted on the upper arm 10 and a comparatively big deformation will be permitted to the elastic portion 18c-4 when a pressing force, directed toward the inner side of the vehicle, is exerted on the upper arm 10. Therefore, the bushing 18-4 has a hard elastic property against the strain force and has a soft elastic property against the pressing force.

Figure 15A:
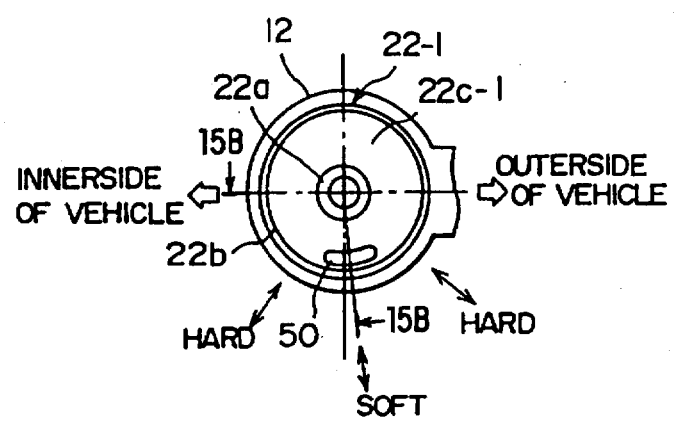
FIG. 15A is a plan view of a first embodiment of a bushing which is used for connecting a lower arm of the suspension shown in FIG. 1.
Figure 15B:
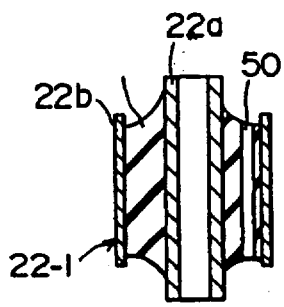
FIG. 15B is a cross-sectional view taken along a line 15B—15B shown in FIG. 15A.
Figure 16A:
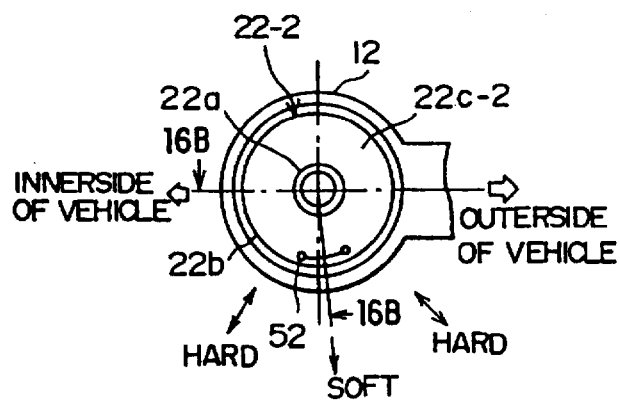
FIG. 16A is a plan view of a second embodiment of a bushing which is used for connecting the lower arm of the suspension shown in FIG. 1.
Figure 16B:
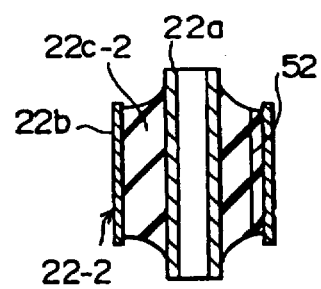
FIG. 16B is a cross-sectional view taken along a line 16B—16B shown in FIG. 16A.
Figure 17A:
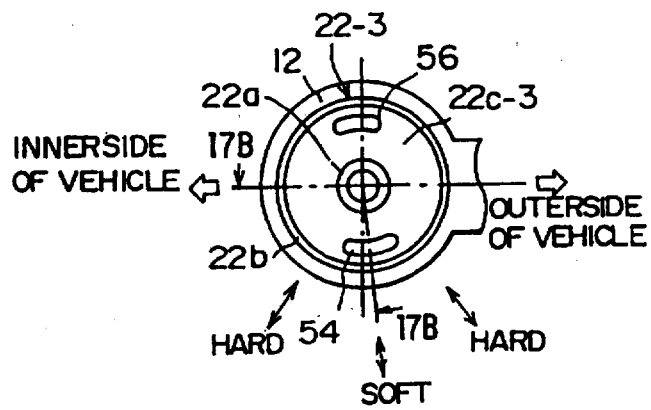
FIG. 17A is a plan view of a third embodiment of a bushing which is used for connecting the lower arm of the suspension shown in FIG. 1.
Figure 17B:
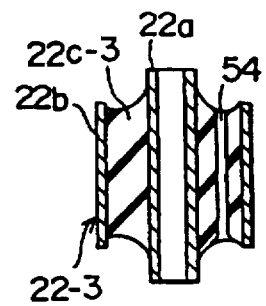
FIG. 17B is a cross-sectional view taken along a line 17B—17B shown in FIG. 17A.

Hereinafter, a description of embodiments of the bushing 22 will be given with reference to FIG. 15 through FIG. 17. FIG. 15 through FIG. 17 show bushings 22-1~22-3 which are embodiments of the bushing 22 used in the suspension shown in FIG. 1. FIG. 15A~FIG. 17A are plan views of the bushings 22-1~22-3 and FIG. 15B~FIG. 17B are cross-sectional views of the bushings 22-1~22-3 which are taken along lines 15B-15B~17B-17B, respectively, indicated in FIG. 15A~FIG. 17A. The bushings 22-1~22-3 have features at their elastic portions 22c-1~22c-3. Thus, a description of the inner cylinder 22a and the outer cylinder 22b will be omitted.

The bushing 22-1 shown in FIG. 15 includes an elastic portion 22c-1 which has a through hole 50 located at a lower side of the inner cylinder 22a and slightly toward the outer side of the vehicle. According to the structure discussed above, the bushing 22-1 has a soft elastic property against a force directed from the center of the inner cylinder 22a toward the center of the through hole 50, namely, a force which presses the lower arm 12 toward a lower and slightly toward the outer side of the vehicle. Moreover, the bushing 22-1 shows a hard elastic property, against the force pressing the lower arm 12 toward a lower-outer side of the vehicle or a lower-inner side of the vehicle.

The bushing 22-2 shown in FIG. 16 includes an elastic portion 22c-2 which has a slit 52 located at a lower side of the inner cylinder 22a and slightly toward the outer side of the vehicle. According to the structure discussed above, the bushing 22-2 has a soft elastic property against a force which presses the lower arm 12 toward a lower and slightly toward the outer side of the vehicle by separating the slit 52. Therefore, same as the bushing 22-1, the elastic property shown in FIG. 1, namely, the elastic properties which are required of the bushing 22 will be also provided by the bushing 22-2.

The bushing 22-3 shown in FIG. 17 includes an elastic portion 22c-3 which has through holes 54 and 56 located at opposite sides of the inner cylinder 22a. The through hole 54 is located at a lower side of the inner cylinder 22a and slightly toward the outer side of the vehicle and the through hole 56 is located at an upper side of the inner cylinder 22a and slightly toward the inner side of the vehicle. According to the structure discussed above, the bushing 22-3 has a soft elastic property against a force which presses the lower arm 12 toward a lower and slightly toward the outer side of the vehicle by deforming the through holes 54 and 56.

As discussed above, according to the bushings 22-1~22-3 shown in FIG. 15~FIG. 17, it is possible to prevent the outer wheel 30-out from moving toward the positive camber state and to prevent the inner wheel 30-in from moving toward an excessive negative camber state. However, the elastic properties shown by the bushings 22-1~22-3 are sensitive to the direction of the force exerted on the lower arm 12. Thus, in a case where the bushings 22-1~22-3 are used to connect the lower arm, it is required to adjust an assembly angle of the bushings 22-1~22-3 accurately. Moreover, to provide such a sensitive characteristic, it is difficult to make a big difference between the hard elastic property which should be provided when the vehicle is turning and the soft elastic property which should be provided when the vehicle is moving substantially straight.

On the other hand, as discussed above, road holding of the inner wheels 30-in has less influence than the one of the outer wheels 30-out as to maneuverability of the vehicle. Therefore, even if the bushing 22 has a soft elastic property against a force which presses the lower arm 12 toward the lower-outer side of the vehicle, the maneuverability of the vehicle would not be substantially worse. Thus, although stability of the camber angle of the inner wheel 30-in decreases, it is possible to provide both improved riding comfort and the increased cornering ability by giving the bushing 22 shown in FIG. 1 elastic properties which have a hard elastic property against a force pressing the lower arm 12 toward the lower-inner side of the vehicle and has a soft elastic property against a force pressing the lower arm 12 toward the lower side of the vehicle or the lower-outer side of the vehicle.

Figure 18A:
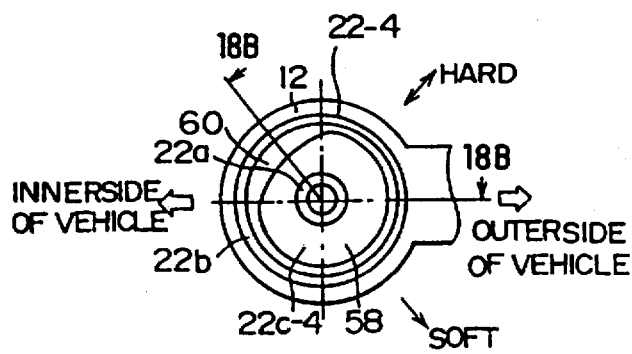
FIG. 18A is a plan view of a fourth embodiment of a bushing which is used for connecting the lower arm of the suspension shown in FIG. 1.
Figure 18B:
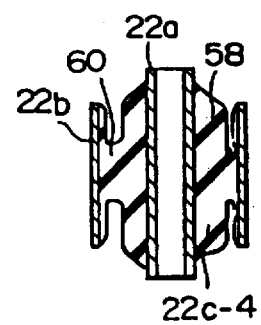
FIG. 18B is a cross-sectional view taken along a line 18B—18B shown in FIG. 18A.
Figure 19A:
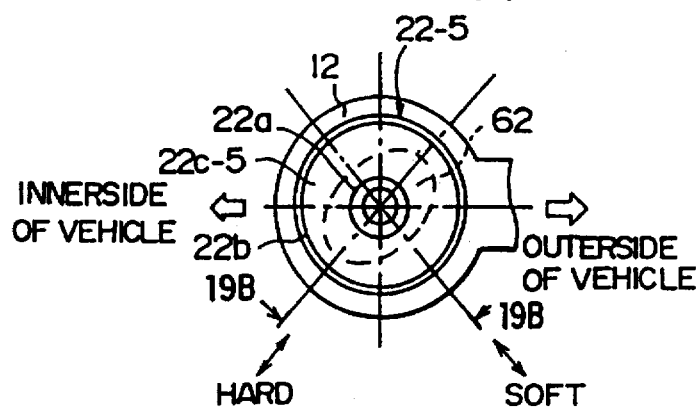
FIG. 19A is a plan view of a fifth embodiment of a bushing which is used for connecting the lower arm of the suspension shown in FIG. 1.
Figure 19B:
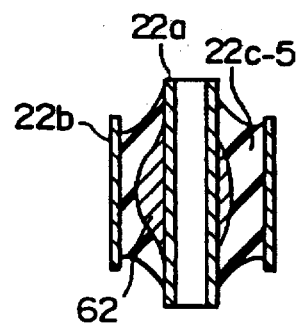
FIG. 19B is a cross-sectional view taken along a line 19B—19B shown in FIG. 19A.
Figure 20A:
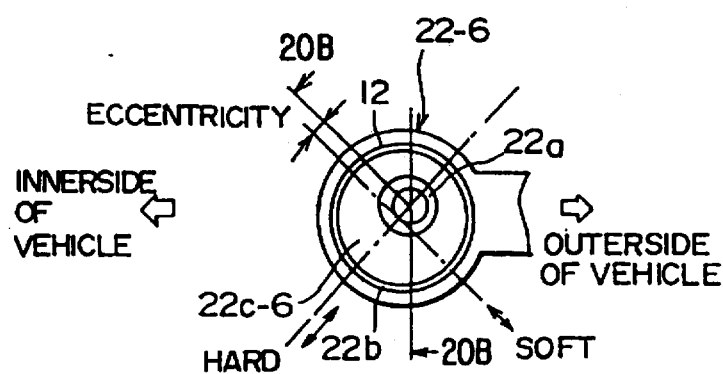
FIG. 20A is a plan view of a sixth embodiment of a bushing which is used for connecting the lower arm of the suspension shown in FIG. 1.
Figure 20B:
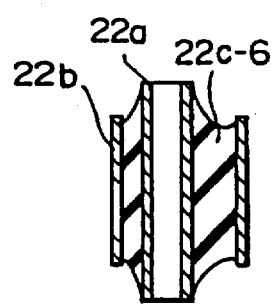
FIG. 20B is a cross-sectional view taken along a line 20B—20B shown in FIG. 20A.

FIG. 18 through FIG. 20 show bushings 22-4~22-6 which are embodiments of the bushing 22 used in the suspension shown in FIG. 1. The bushings 22-4~22-6 have the elastic properties discussed above. FIG. 18A~FIG. 20A are plan views of the bushings 22-4~22-6 and FIG. 18B~FIG. 20B are cross-sectional views of the bushings 22-4~22-6 which are taken along lines 18B-18B~20B-20B, respectively, indicated in FIG. 18A~FIG. 20A. In FIG. 18~FIG. 20, those parts that are the same as the ones shown in FIG. 15~FIG. 17 are given the same reference number, and a description thereof will be omitted.

The bushing 22-4 shown in FIG. 18 includes an elastic portion 22c-4 which has a thick portion 58 and a thin portion 60. The elastic portion 22c-4 is formed so that the thin portion 60 is located at an upper-inner side of the vehicle. According to the structure, when the lower arm 12 is pressed toward a lower-inner side of the vehicle, the pressing force is not transmitted to the thin portion 60. As a result, in this case, the bushing 22-4 has a hard elastic property. On the other hand, when the lower arm 12 is pressed toward a lower-outer side of the vehicle, the pressing force is transmitted to the thin portion 60. Thus, in this case, the bushing 22-4 has a soft elastic property. Therefore, according to the bushing 22-4, it is possible to provide both improved riding comfort and increased cornering ability without complicated adjustments.

The bushing 22-5 shown in FIG. 19 includes an elastic portion 22c-5 which is molded to an inner bulge 62. The inner bulge 62 extends between an upper-outer side of the vehicle and a lower-inner side of the vehicle. The lower arm 12 which is connected by the bushing 22-5 can have a comparatively large movement toward the lower-outer side of the vehicle and comparative small movement toward the upper-outer side of the vehicle. Accordingly, the elastic properties discussed above are also provided by the bushing 22-5.

The bushing 22-6 shown in FIG. 20 includes an elastic portion 22c-6 which holds the inner cylinder 22a at an upper-outer side of the center of the outer cylinder 22b. In this case, only a small deformation will be permitted to the elastic portion 22c-6 when the lower arm 12 is pressed toward the lower-inner side of the vehicle and a comparatively big deformation will be permitted to the elastic portion 22c-6 when the lower arm 12 is pressed toward the lower-outer side of the vehicle. Therefore, the elastic properties discussed above are also provided by the bushing 22-6.

Incidentally, the bushings 22-1~22-3 shown in FIG. 15~FIG. 17 and the bushings 22-4~22-6 shown in FIG. 18-FIG. 20 are the same with regard to showing a soft elastic property and a hard elastic property in accordance with the direction of the force exerted thereon. Thus, it is possible to provide the elastic properties shown by the bushings 22-4~22-6 by using a slit or through holes which are the same as the ones used in the bushings 22-1~22-3. On the other hand, it is possible to provide the elastic properties shown by the bushings 22-1~22-3 by using a thin portion, an inner bulge or an inner cylinder held eccentrically which correspond to the ones used in the bushings 22-4~22-6.

Although special elastic properties are given to the bushings 18 and 22 in the present embodiment, the present invention is not limited to such structure. Namely, both improved riding comfort and increased cornering ability are provided by the suspension which has at least one bushing showing the above discussed elastic properties.

Hereinafter, a description of the suspension of a second embodiment of the present invention will be given with reference to FIG. 21 through FIG. 25. In FIG. 21 through FIG. 25, those parts which are the same as ones shown in FIG. 1 through FIG. 10 are given the same reference number and a description thereof will be omitted.

Figure 21:
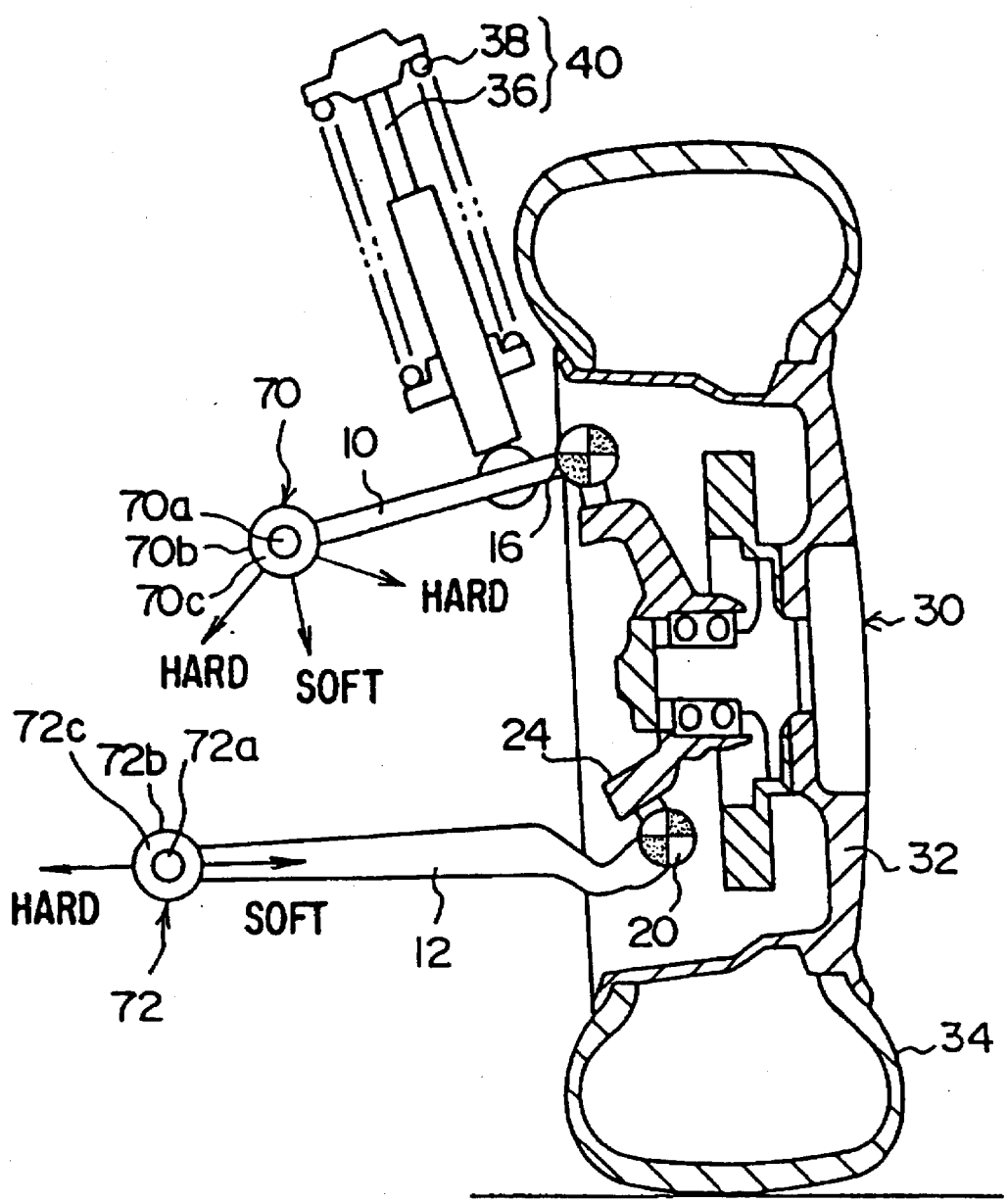
FIG. 21 is a front sectional view of a suspension of a second embodiment of the present invention.

FIG. 21 is a front sectional view of the suspension of the present embodiment. The suspension shown in FIG. 21 has features such as the shock absorber 36 of the load transmitting part 40 is connected with the upper arm 10 at the bottom thereof, and the upper arm 10 and the lower arm 12 are connected with the body by bushings 70 and 72 which have elastic properties different from ones of the bushings 18 and 22.

Directions of force transmitted to the upper arm 10 and the lower arm 12 are different depending on whether the shock absorber 36 is connected with the lower arm 12 or the upper arm 10. The suspension of the present embodiment has the latter structure. In the present embodiment, those efficiencies which are the same as the suspension shown in FIG. 1 are obtained by giving special elastic properties to the bushings 70 and 72.

Each of the bushings 70 and 72 has an inner cylinder 70a or 72a, an outer cylinder 70b or 72b and an elastic portion 70c or 72c, respectively, same as the bushings 18 and 22 shown in FIG. 1. As shown in FIG. 21, the bushing 70 has a hard elastic property against a force which presses the outer cylinder 70b, namely, the upper arm 10 toward an lower-inner side of the vehicle or a lower-outer side of the vehicle and has a soft elastic property against a force which presses the upper arm 10 toward a lower side of the vehicle. On the other hand, the bushing 72 has a soft elastic property against a force which produces a strain on the outer cylinder 72b, namely, the lower arm 12 toward an outer side of the vehicle and has a hard elastic property against a force which presses the lower arm 12 toward an inner side of the vehicle.

Figure 22:
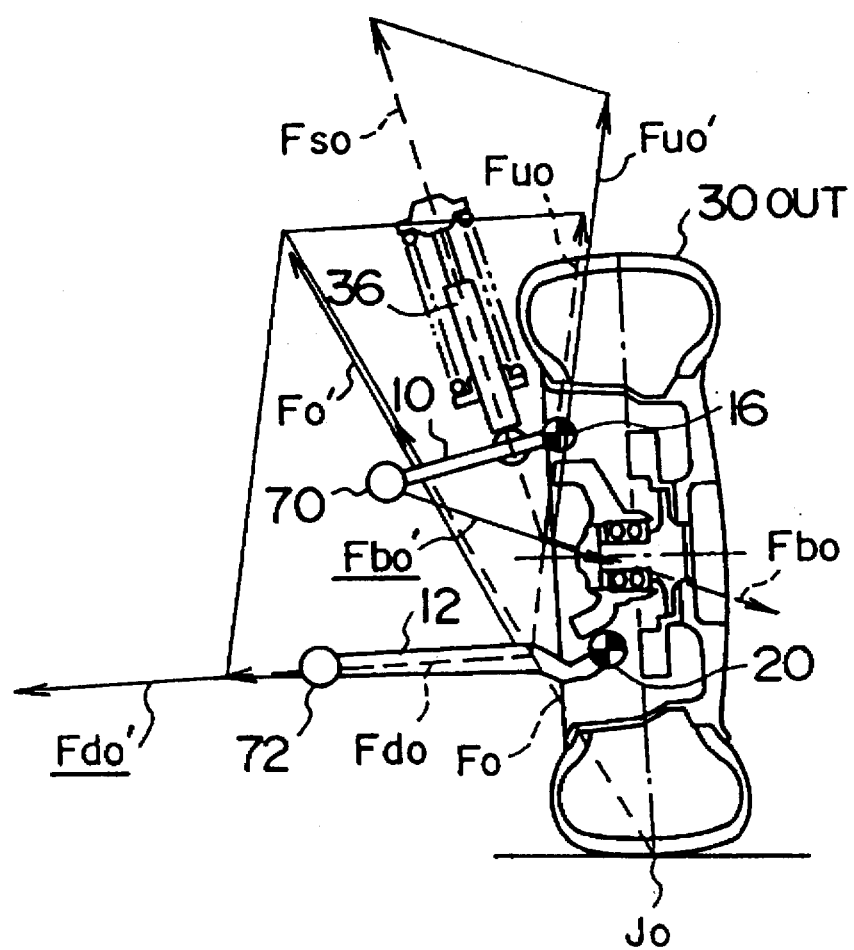
FIG. 22 shows vectors of force exerted on the suspension of the second embodiment holding an outer wheel when a high lateral acceleration is exerted on a vehicle.

FIG. 22 shows force vectors exerted on the upper ball joint 16 and the lower ball joint 20 of the suspension which holds an outer wheel 30-out. As discussed above, a reaction force of lateral acceleration and vertical load of a vehicle exerts a resultant force Fo at a road contact portion Jo of the outer wheel 30-out. The resultant force Fo is transmitted into the upper arm 10 and the lower arm 12 via the upper ball joint 16 and the lower ball joint 20, respectively.

The resultant force Fo can be shown as a vector Fo' which extends from a crossing point of the lower arm 12 and the vector Fo, as shown by a continuous line in FIG. 22. The force Fo' can be separated into a vector Fdo which has the same direction as the axial direction of the lower arm 12 and a vector Fuo which extends from a starting point of the vector Fo' toward the upper ball joint 16. The lower arm 12 shown in FIG. 22 accepts, same as the upper arm shown in FIG. 1, only a force directed in the axial direction of the lower arm 12. Thus, the vector Fdo shown in FIG. 22 can be considered as a vector of force Fdo' which is exerted on the lower ball joint 20 and the vector Fuo shown in FIG. 22 can be considered as a vector of force Fuo' which is exerted on the upper ball joint 16.

The force exerted on the lower ball joint 20, namely, the force Fdo can be considered the same as the force exerted on the bushing 72. Thus, as shown in FIG. 22, the force which is exerted on the bushing 72 of the outer wheel 30-out can be shown as a vector Fdo' which has the same direction and the same strength as the vector Fdo has. On the other hand, the force exerted on the upper ball joint 16, namely, the force Fuo is transmitted to the bushing 70 and the shock absorber 36 via the upper arm 10. Thus, the bushing 70 of the upper arm 10 accepts only the force which the load transmitting part 40 cannot accept.

The force Fuo shown by a broken line in FIG. 22 can be considered a vector Fuo' which extends from a crossing point of an extended line of an axial line of the shock absorber 36 and the vector Fuo. The vector Fuo' can be separated into a vector Fso which has the same direction as the axial direction of the shock absorber 36 and a vector Fbo which has the same direction as a vector extending from the bushing 70 to a starting point of the vector Fuo'.

The shock absorber 36 is connected with the upper arm 10 so as to be able to swing, i.e., move in a substantially arcuate, vertical motion. Thus, the load transmitting part 40 can only accept a force which has the same direction as the axial direction of the shock absorber 36. Therefore, the vector Fso shown in FIG. 22 can be considered as a force which is accepted by the load transmitting part 40 and the vector Fbo, namely, the vector Fbo' shown in FIG. 22 can be considered as a force which is exerted on the bushing 70. The vector Fbo' is directed to a lower-outer side of the vehicle. Accordingly, the bushing 70 of the outer wheel 30-out is pressed toward the lower-outer side of the vehicle.

Figure 23:
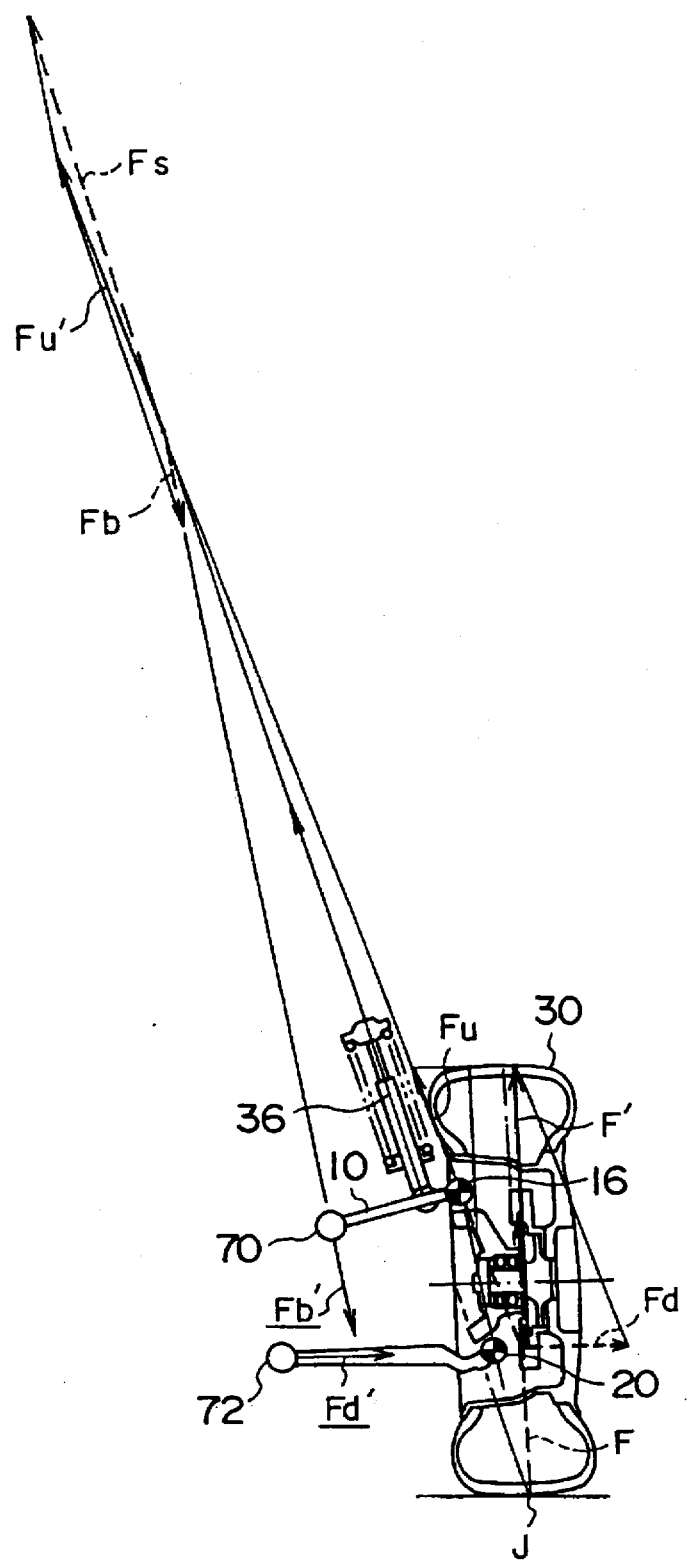
FIG. 23 shows vectors of force exerted on the suspension of the second embodiment when the vehicle moves in a straight line.

Hereinafter, a description of a movement of the suspension in a situation where almost no lateral acceleration Fc is exerted on the vehicle, namely, a case where the vehicle moves substantially straight will be given with reference to FIG. 23. FIG. 23 shows force vectors exerted on the bushings 70 and 72.

In the situation shown in FIG. 23, the force F which is directed substantially vertically is exerted at the contact portion J of the wheel 30, since almost no lateral acceleration is exerted on the vehicle. The force F shown in FIG. 23 can be considered as a vector F'which extends from a point on an extended line of an axial line of the lower arm 12. The vector F' can be separated into a vector Fd which has the same direction as the axial direction of the lower arm 12 and a vector Fu which extends from a starting point of the vector F' toward the upper ball joint 16. The vector Fd can be considered as a vector Fd' of force which extends from the bushing 72 toward an outer side of the vehicle. Thus, when the vehicle moves substantially straight, the bushing 72 is strained toward the outer side of the vehicle.

The vector Fu discussed above can be shown as a vector Fu' which extends from a crossing point of the axial line of the shock absorber 36 and the extended line of the vector Fu. The vector Fu' can be separated into a vector Fs which has the same direction as the axial direction of the shock absorber 36 and a vector Fb which extends from a starting point of the vector Fu' toward the bushing 70. Then, the vector Fb can be shown as a vector Fb' which extends from the bushing 70 toward a lower-outer side of the vehicle. Thus, when the vehicle moves substantially straight, the bushing 70 is pressed toward a lower-outer side of the vehicle by the force Fb'.

Figure 24:
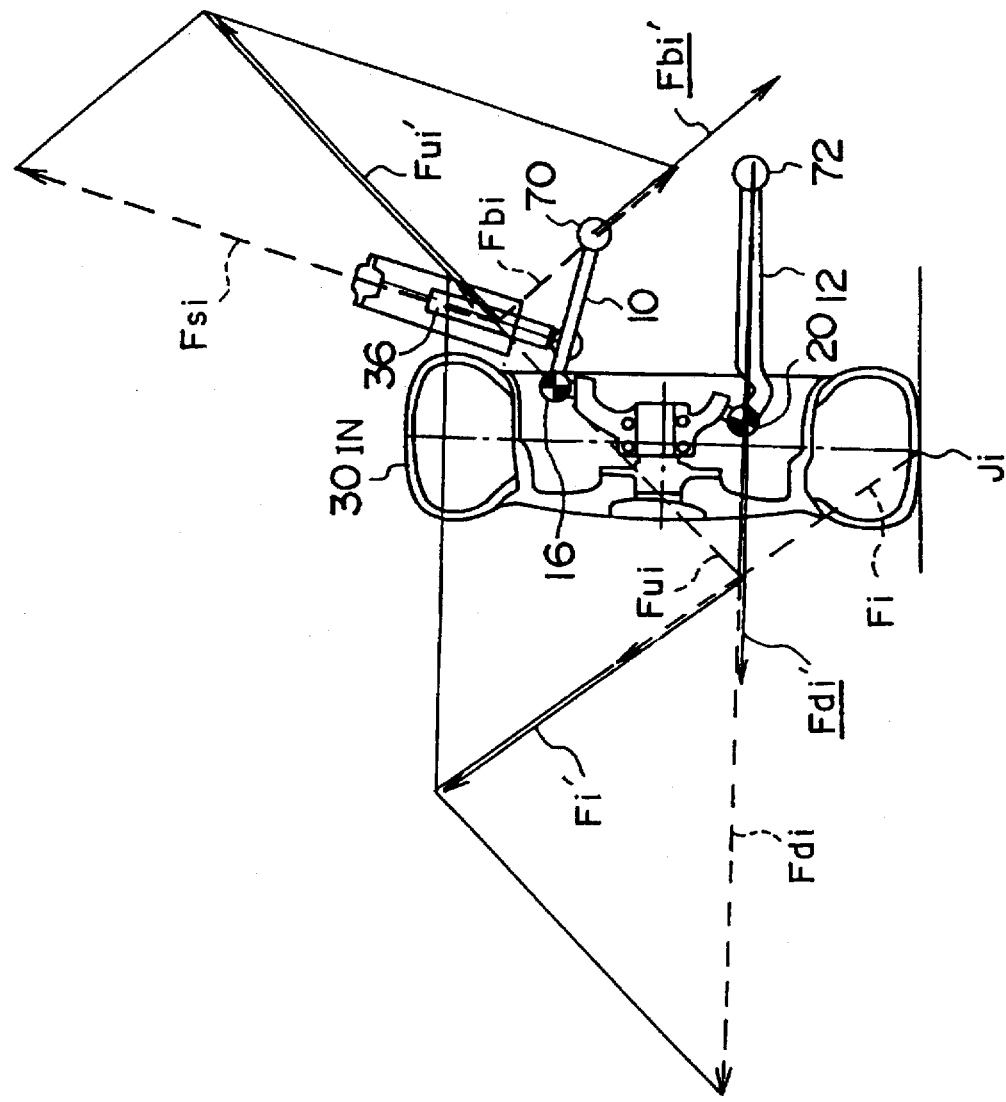
FIG. 24 shows vectors of force exerted on the suspension of the second embodiment holding an inner wheel when a high lateral acceleration is exerted on the vehicle.

Hereinafter, a description of directions of force exerted on bushings 70 and 72 of the suspension holding the inner wheel 30-in will be given with reference to FIG. 24. FIG. 24 shows force vectors exerted on the suspension of the inner wheel 30-in while the vehicle is turning.

As discussed above, a reaction force of lateral acceleration and the vertical load of a vehicle exerts a resultant force Fi at a road contact portion Ji of the inner wheel 30-in. The resultant force Fi directed to the upper-outer side of the vehicle can be shown as a vector Fi' by continuous line in FIG. 24. The vector Fi' can be separated into a vector Fui which extends from a starting point of the vector Fi' and a vector Fdi which has the same direction as the axis of the lower arm 12. The vector Fui can be shown as a vector Fui' extending from a crossing point of the axial line of the shock absorber 36 and the vector Fui. Moreover, the vector Fui' can be separated into a vector Fsi extending in an axial direction of the shock absorber 36 and a vector Fbi extending from a starting point of the vector Fui' toward the bushing 70. The vector Fbi can be considered as a vector Fbi' of force which is exerted on the bushing 70. On the other hand, the vector Fdi discussed above can be shown as a vector Fdi' of force which is exerted on the bushing 72. Therefore, the bushing 70 of the inner wheel 30-in is pressed toward the lower-inner side of the vehicle and the bushing 72 of the inner wheel 30-in is pressed substantially toward the outer side of the vehicle while the vehicle is turning.

Figure 25:
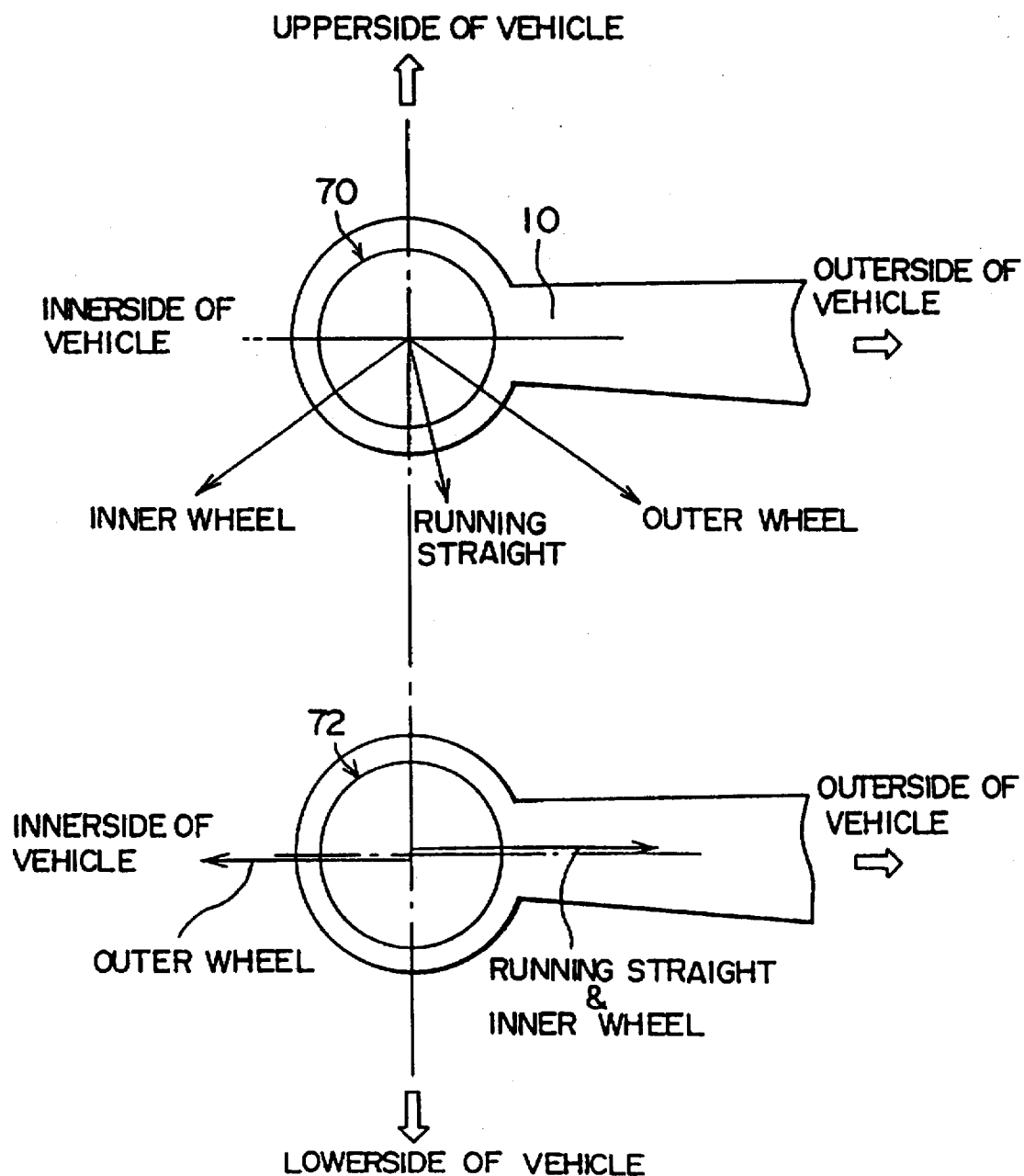
FIG. 25 shows a direction of force exerted on the suspension of the second embodiment in several situations.

FIG. 25 shows details of the above description, namely, the directions of the force exerted on the bushings 70 and 72 in the several situations discussed above. Namely, the bushings 70 and 72 are pressed or strained in the several directions shown in FIG. 25 in accordance with running situations of the vehicle.

Therefore, if the bushing 70 has a hard elastic property against the force directed to a lower-inner side of the vehicle and a lower-outer side of the vehicle, and has a soft elastic property against the force substantially directed toward a lower side of the vehicle, a movement toward the positive camber state of the outer wheel 30-out and a movement toward an excessive negative camber state of the inner wheel 30-in would be effectively prohibited, and the vibration transmitted to the wheel 30 when the vehicle moves substantially straight would be effectively absorbed, by the bushing 70. Moreover, if the bushing 72 has a soft elastic property against the force directed toward an outer side of the vehicle and has a hard elastic property against the force directed toward an inner side of the vehicle, a movement toward the positive camber state of the outer wheel 30-out would be effectively prohibited and vibrations transmitted to the wheel 30 when the vehicle moves substantially straight would be effectively absorbed by the bushing 72.

In the present embodiment, as shown in FIG. 21, the preferable elastic properties discussed above are given to the bushings 70 and 72, respectively. Therefore, according to the suspension of the present embodiment, it is possible to effectively absorb the running vibration and to keep the outer and inner wheel 30-out and 30-in in an ideal negative camber state during a turning of the vehicle. Accordingly, both improved riding comfort and increased cornering ability are obtained by the suspension of the present embodiment.

As discussed above, the bushing 70 of the present embodiment is useful to prevent the outer wheel 30-out from moving toward the positive camber state and to prevent the inner wheel 30-in from moving toward an excessive negative camber state. However, road holding of the inner wheels 30-in has less influence than one of the outer wheels 30-out to maneuverability of the vehicle. Therefore, even if the bushing 70 has a soft elastic property against the force which presses the upper arm 10 toward the lower-inner side of the vehicle, the maneuverability of the vehicle would not become substantially worse. Thus, it is possible to obtain both improved riding comfort and increased cornering ability by giving the bushing 70, shown in FIG. 21, an elastic property which has a hard elastic property against the force pressing the upper arm 10 toward the lower-outer side of the vehicle and has a soft elastic property against the force pressing the upper arm 10 toward the lower side of the vehicle and the lower-inner side of the vehicle.

incidentally, the bushings 70 and 72 used in the present embodiment and the bushings 18 and 22 used in the first embodiment discussed above are the same as to showing a soft elastic property and a hard elastic property in accordance with the direction of the force exerted thereon. Thus, the bushings 70 and 72 can be manufactured by using the same structure as the bushings 18 and 22, namely, the structures shown in FIG. 11 through FIG. 20.

Although the upper arm 10 and the lower arm 12 are connected with the body of the vehicle via the bushings 18 and 22 or 70 and 72, and connected with the wheel support parts 14 via the upper and the lower ball joints 16 and 20, the present invention is not limited to that structure. Namely, it is possible to assemble the suspension by connecting the upper arm 10 and the lower arm 12 with the body of the vehicle via ball joints and connecting the upper arm 10 and the lower arm 12 with the wheel supporting portions 14 via bushings.

The present invention is not limited to the specifically disclosed embodiments, and variations and modifications may be made without departing from the scope of the present invention.

What is claimed is:

1. A vehicle suspension having bushings with direction dependent elastic properties comprising:

a wheel support that rotatably supports a wheel;

a lower arm swingably connected to the wheel support and a body of a vehicle at respective ends thereof;

an upper arm swingably connected to the wheel support and the body of the vehicle at respective ends thereof;

a load transmitting part that transmits the load of the vehicle to one of the lower arm and the upper arm to thereby designate a loaded arm and an unloaded arm; and a bushing arrangement is positioned between all connections between the loaded arm and the body; wherein the bushing arrangement has a different modulus of elasticity when the loaded arm is pressed toward a lower-inner side of the vehicle than when the loaded arm is pressed toward a lower-outer side of the vehicle such that the camber of the wheel is controlled.

2. The suspension of claim 1, wherein the bushing arrangement comprises at least one bushing with an elastic portion having at least one slit located at a predetermined position therein.

3. The suspension of claim 1, wherein the bushing arrangement comprises at least one bushing with an elastic portion having at least one through hole located at a predetermined position therein.

4. The suspension of claim 1, wherein the bushing arrangement comprises at least one bushing with an elastic portion having a thin portion and a thick portion formed into predetermined shapes.

5. The suspension of claim 1, wherein the bushing arrangement comprises at least one bushing with an elastic portion having a bulge extending in at least one predetermined direction.

6. The suspension of claim 1, wherein the bushing arrangement comprises at least one bushing with an elastic portion eccentrically enclosing an inner cylinder of said bushing.

7. The vehicle suspension of claim 1, wherein the loaded arm is the lower arm, and the bushing arrangement has a higher modulus of elasticity when the loaded arm is pressed toward a lower-inner side of the vehicle than when the loaded arm is pressed toward a lower-outer side of the vehicle.

8. The vehicle suspension of claim 1, wherein the loaded arm is the upper arm, and wherein the bushing arrangement has a higher modulus of elasticity when the loaded arm is pressed toward a lower-outer side of the vehicle then when the loaded arm is pressed toward a lower-inner side of the vehicle.

9. A vehicle suspension having bushings with direction dependent elastic properties comprising:

a wheel support that rotatably supports a wheel;

a lower arm swingably connected to the wheel support and a body of a vehicle at respective ends thereof;

an upper arm swingably connected to the wheel support and the body of the vehicle at respective ends thereof;

a load transmitting part that transmits the load of the vehicle to one of the lower arm and the upper arm to thereby designate a loaded arm and an unloaded arm; and a bushing arrangement positioned between all connections between the loaded arm and the body, wherein the bushing arrangement has a higher modulus of elasticity when the loaded arm is pressed toward a lower-inner side of the vehicle and a lower-outer side of the vehicle than when the loaded arm is pressed toward a lower side of the vehicle.

10. The suspension of claim 9, wherein the bushing arrangement comprises at least one bushing having an elastic portion having at least one slit.

11. The suspension of claim 9, wherein the bushing arrangement comprises at least one bushing having an elastic portion having at least one through hole.

12. The suspension of claim 9, wherein the bushing arrangement comprises at least one bushing having an elastic portion having a thin portion and a thick portion.

13. The suspension of claim 9, wherein the bushing arrangement comprises at least one bushing having an elastic portion having a bulge.

14. The suspension of claim 9, wherein the bushing arrangement comprises at least one bushing having an elastic portion eccentrically enclosing an inner cylinder.

15. A vehicle suspension having bushings with direction dependent elastic properties comprising:

a wheel support that rotatably supports a wheel;

a lower arm swingably connected to the wheel support and a body of a vehicle at respective ends thereof;

an upper arm swingably connected to the wheel support and the body of the vehicle at respective ends thereof;

a load transmitting part that transmits the load of the vehicle to one of the lower arm and the upper arm to thereby designate a loaded arm and an unloaded arm;

a bushing arrangement positioned between all connections between the unloaded arm and the body, wherein the bushing arrangement has a different modulus of elasticity when the unloaded arm is pressed toward an inner side of the vehicle than when the unloaded arm is pressed toward an outer side of the vehicle such that the camber of the wheel is controlled.

16. The vehicle suspension of claim 15, wherein the unloaded arm is the upper arm, and wherein the bushing arrangement has a higher modulus of elasticity when the unloaded arm is pressed toward an outer side of the vehicle than when the unloaded arm is pressed toward an inner side of the vehicle.

17. The vehicle suspension of claim 15, wherein the unloaded arm is the lower arm, and wherein the bushing arrangement has a higher modulus of elasticity when the unloaded arm is pressed toward an inner side of the vehicle than when the unloaded arm is pressed toward an outer side of the vehicle.

* * * * *